US012532893B2

(12) United States Patent
Dobizl et al.

(10) Patent No.: US 12,532,893 B2
(45) Date of Patent: Jan. 27, 2026

(54) DISPENSING SYSTEM FOR TRANSFERRING CHEMICAL INTO A STRAINER BASKET ASSEMBLY

(71) Applicant: Ecolab USA Inc., Saint Paul, MN (US)

(72) Inventors: Kenneth Thomas Dobizl, Mounds View, MN (US); Emily Gaynor, Oak Ridge, NC (US); Tracy Graham, Cleveland, NC (US); Amber Langley, Cedar Grove, NC (US); Gina McDowell, Greensboro, NC (US); Elaine Money, Oak Ridge, NC (US); Shravan Prasad, Greensboro, NC (US); Benjamin Schaefer, Roseville, MN (US); Daniel Wald, Burnsville, MN (US); Daniel Anderson, Eagan, MN (US); Daniel August Gentilini, Lino Lakes, MN (US)

(73) Assignee: Ecolab USA Inc., Saint Paul, MN (US)

( * ) Notice: Subject to any disclaimer, the term of this patent is extended or adjusted under 35 U.S.C. 154(b) by 293 days.

(21) Appl. No.: 18/349,320

(22) Filed: Jul. 10, 2023

(65) Prior Publication Data

US 2023/0345976 A1    Nov. 2, 2023

Related U.S. Application Data

(62) Division of application No. 16/888,285, filed on May 29, 2020, now Pat. No. 11,696,591.

(Continued)

(51) Int. Cl.
*A23B 2/729*    (2025.01)
*B08B 3/08*    (2006.01)

(52) U.S. Cl.
CPC ............. *A23B 2/7295* (2025.01); *B08B 3/08* (2013.01); *A23V 2002/00* (2013.01)

(58) Field of Classification Search
CPC ...... A23L 3/34635; A23L 3/3589; A23L 3/00; B08B 3/08; A23V 2002/00; A23B 7/158;
(Continued)

(56) References Cited

U.S. PATENT DOCUMENTS

| 4,216,885 A | 8/1980 | Sedam |
| 4,765,525 A | 8/1988 | Popp et al. |

(Continued)

FOREIGN PATENT DOCUMENTS

| CA | 2662127 C | 6/2012 |
| CN | 101715351 A | 5/2010 |

(Continued)

OTHER PUBLICATIONS

Kay LiquidSense All Purpose Cleaner, Kay Chemical Company, Ecolab, Sep. 12, 2018, 1 page.

(Continued)

*Primary Examiner* — David J Walczak
(74) *Attorney, Agent, or Firm* — Fredrikson & Byron, P.A.

(57) ABSTRACT

A strainer basket system may include a reservoir in which a strainer basket is positioned and a chemical dispensing docking station. The chemical dispensing docking station may have a cavity that receives a container of chemical to be dispensed and a retention mechanism that is configured to mechanically engage and retain the container of chemical, when inserted into the cavity. The docking station may also include a piercing member positioned to pierce the container of chemical as the container of chemical is inserted into the cavity, thereby releasing chemical into the reservoir and/or strainer basket.

14 Claims, 14 Drawing Sheets

Related U.S. Application Data

(60) Provisional application No. 62/854,881, filed on May 30, 2019.

(58) Field of Classification Search
CPC ..... A23B 2/7295; A23B 7/153; D06F 39/022; A47L 13/58; A47L 15/4418; B65D 85/00
USPC .................................. 222/80, 81, 83, 89, 91
See application file for complete search history.

(56) References Cited

U.S. PATENT DOCUMENTS

| | | | |
|---|---|---|---|
| 4,886,192 A | 12/1989 | Cassia | |
| 4,925,327 A * | 5/1990 | Wirt ...................... | B65D 47/42 604/3 |
| 5,922,378 A | 7/1999 | Kagan et al. | |
| 5,979,696 A | 11/1999 | Bode et al. | |
| 6,182,865 B1 | 2/2001 | Bunschoten et al. | |
| 6,193,058 B1 | 2/2001 | Yacko et al. | |
| 6,209,752 B1 | 4/2001 | Mitchell et al. | |
| 6,290,100 B1 | 9/2001 | Yacko et al. | |
| 6,312,480 B1 | 11/2001 | Jakob et al. | |
| 6,435,231 B1 | 8/2002 | Cooper et al. | |
| 6,857,250 B1 | 2/2005 | Taylor | |
| 6,968,876 B2 | 11/2005 | Yacko et al. | |
| 7,059,104 B2 | 6/2006 | Taylor | |
| D575,160 S | 8/2008 | Mueller et al. | |
| D596,944 S | 7/2009 | Mueller et al. | |
| D605,943 S | 12/2009 | Mueller et al. | |
| D617,197 S | 6/2010 | Mueller et al. | |
| 7,922,032 B2 | 4/2011 | Mueller et al. | |
| 8,499,981 B2 | 8/2013 | Quinlan et al. | |
| 8,622,242 B2 | 1/2014 | Pelfrey | |
| 8,794,474 B2 | 8/2014 | Mueller et al. | |
| 8,939,325 B2 | 1/2015 | Liang et al. | |
| 9,636,471 B2 | 5/2017 | Anderson et al. | |
| 9,648,990 B1 | 5/2017 | Corney | |
| 2005/0100639 A1 | 5/2005 | Pearce | |
| 2005/0247725 A1 | 11/2005 | Smith | |
| 2006/0076429 A1 | 4/2006 | Kvietok et al. | |
| 2007/0205218 A1 | 9/2007 | Mueller et al. | |
| 2007/0228074 A1 | 10/2007 | Mueller et al. | |
| 2008/0302803 A1 | 12/2008 | Yacko et al. | |
| 2009/0090431 A1 | 4/2009 | Yacko et al. | |
| 2009/0140004 A1 | 6/2009 | Scorgie | |
| 2009/0308889 A1 | 12/2009 | Lindsay et al. | |
| 2010/0163578 A1 | 7/2010 | Mueller et al. | |
| 2010/0236952 A1 | 9/2010 | Masterson et al. | |
| 2011/0036454 A1 | 2/2011 | Saito et al. | |
| 2012/0031930 A1 | 2/2012 | Fileccia et al. | |
| 2013/0000781 A1 | 1/2013 | Bischoff et al. | |
| 2013/0133705 A1 | 5/2013 | Classen et al. | |
| 2015/0101121 A1 | 4/2015 | Burgo, Sr. et al. | |
| 2015/0251892 A1 | 9/2015 | Ciavarella et al. | |
| 2016/0296865 A1 | 10/2016 | Blanks et al. | |
| 2017/0052051 A1 | 2/2017 | Emmert | |

FOREIGN PATENT DOCUMENTS

| | | | |
|---|---|---|---|
| CN | 201996500 U | 10/2011 | |
| CN | 102216170 B | 8/2012 | |
| CN | 103702911 B | 7/2015 | |
| CN | 104955583 A | 9/2015 | |
| CN | 107827286 A | 3/2018 | |
| DE | 202004018176 U1 | 3/2005 | |
| EP | 530789 B1 | 6/1995 | |
| EP | 507404 B1 | 5/1996 | |
| EP | 0781524 A2 | 7/1997 | |
| EP | 1078880 A1 | 2/2001 | |
| EP | 1358832 A1 | 11/2003 | |
| EP | 1545446 A1 | 6/2005 | |
| EP | 1652462 A2 | 5/2006 | |
| EP | 1780146 B1 | 1/2011 | |
| EP | 2328456 B1 | 9/2013 | |
| EP | 2814368 B1 | 12/2015 | |
| EP | 2811881 B1 | 11/2016 | |
| EP | 2627759 B1 | 7/2017 | |
| EP | 3263000 A1 | 1/2018 | |
| GB | 1490600 A | 11/1977 | |
| GB | 2197339 A | 5/1988 | |
| GB | 2501258 A | 10/2013 | |
| WO | 9940166 A1 | 8/1999 | |
| WO | 03061743 A1 | 7/2003 | |
| WO | 03061744 A1 | 7/2003 | |
| WO | 2007143503 A2 | 12/2007 | |
| WO | 2008014444 A2 | 1/2008 | |
| WO | WO-2009094999 A2 * | 8/2009 | ............... B60S 3/04 |
| WO | 2010075078 A1 | 7/2010 | |
| WO | 2011130158 A1 | 10/2011 | |
| WO | 2012048955 A1 | 4/2012 | |
| WO | 2012123763 A2 | 9/2012 | |
| WO | 2012134793 A1 | 10/2012 | |
| WO | 2013103788 A2 | 7/2013 | |

OTHER PUBLICATIONS

Kay LiquidSense Sanitizer, Kay Chemical Company, Ecolab, Sep. 12, 2018, 1 page.

International Patent Application No. PCT/US2020/035356, International Search Report and Written Opinion mailed Sep. 2, 2020, 16 pages.

* cited by examiner

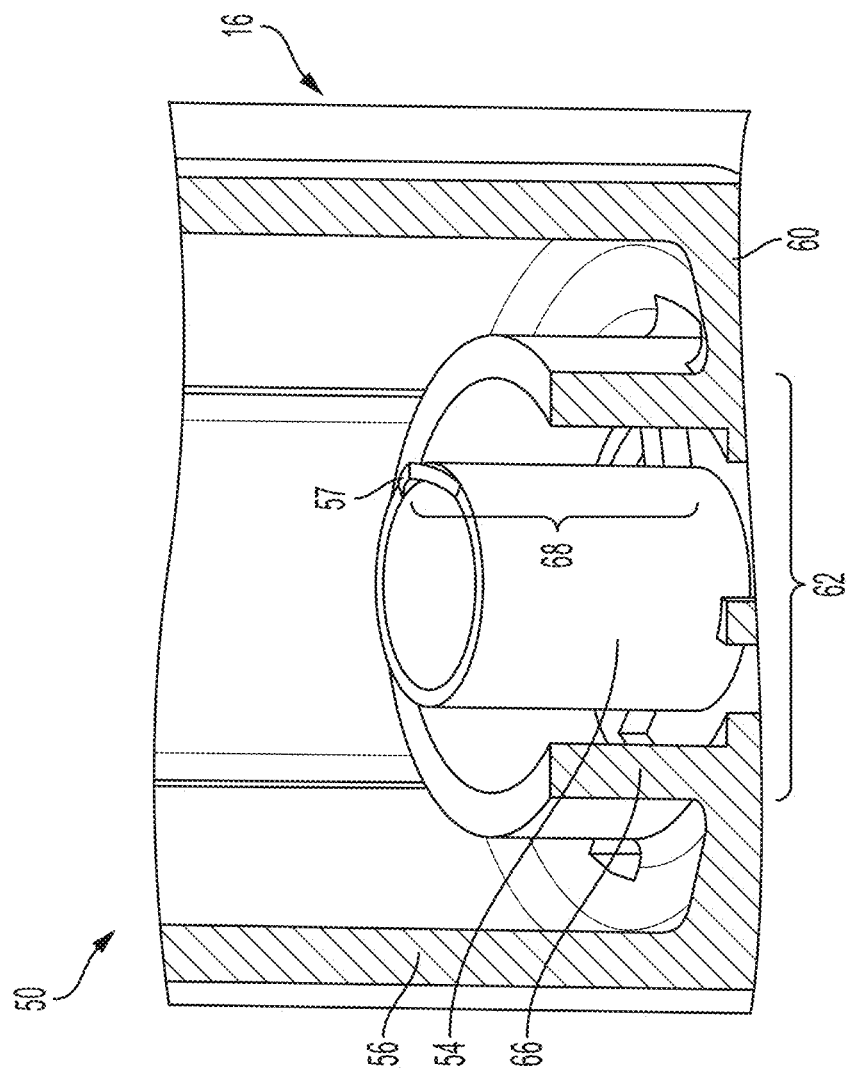

DISPENSING SYSTEM FOR TRANSFERRING CHEMICAL INTO A STRAINER BASKET ASSEMBLY

RELATED MATTERS

This application is a divisional of U.S. patent application Ser. No. 16/888,285, filed May 29, 2020, which claims the benefit of U.S. Provisional Patent Application No. 62/854,881, filed May 30, 2019, the entire contents of which are incorporated herein by reference.

TECHNICAL FIELD

This disclosure relates to chemical dispensing and, more particularly, to systems and techniques for dispensing chemicals.

BACKGROUND

Chemical product dispensers are useful in many different chemical application systems, including water treatment systems like commercial cooling water systems, cleaning systems relating to food and beverage operations, laundry operations, warewashing operations (e.g., dishwashers), pool and spa maintenance, as well as other systems, such as medical operations. For example, chemical products used in water treatment systems may include oxidizing and non-oxidizing biocides to inhibit or destroy growth or activity of living organisms in the water being treated. As another example, chemical products used in food and beverage operations may include sanitizers, sterilants, cleaners, degreasers, lubricants, etc. Chemical products used in a warewashing or laundry operation may include detergent, sanitizers, stain removers, rinse agents, etc. Chemical products used in a laundry operation may include detergent, bleaches, stain removers, fabric softeners, etc. Chemical products used in cleaning of medical/surgical instrumentation may include detergents, cleaning products, neutralizers, sanitizers, disinfectants, enzymes, etc.

In practice, a chemical intended for use may be provided in concentrated form and then diluted on site to make a use solution. Providing concentrated chemical product to a user that is then diluted on site is useful to reduce packaging, shipping, and storage requirements that would otherwise be needed to provide an equivalent amount of product in ready-to-use form. However, a user receiving concentrated chemical typically needs to transfer the chemical from the container in which it is received into a system where the concentrated chemical will be diluted and/or used. To avoid inadvertent contact with the concentrated chemical during transfer, the user may be obligated to wear personal protective equipment (PPE), such as safety glasses, gloves, and/or protective clothing and/or perform the transfer in an area where an eye wash station is present. A chemical dispenser that can safely transfer concentrated chemical while limiting or eliminating the risk of inadvertent spilling during transfer would minimize the need for PPE during use, potentially reducing the amount of training needed to use the system and/or complexity of using the system.

SUMMARY

In general, this disclosure relates to systems, devices, and techniques for transferring chemical from a container in which the chemical is held into a reservoir where the chemical is intended to be used, such a reservoir containing a strainer basket. For example, a strainer basket system may include an outer reservoir and an inner strainer basket that is insertable into and removable from the outer reservoir. The strainer basket system can include a chemical dispensing docking station that facilitates the transfer of chemical from the container in which it is held into the inner strainer basket and/or outer reservoir. In some examples, the chemical dispensing docking station include a retention mechanism and a piercing member. The container of chemical to be dispensed may be inserted into the chemical dispensing docking station while closed. The piercing member can pierce the container, e.g., as the container is inserted into the docking station, causing the contents of the container to dispense into the strainer basket and/or reservoir. The retention member can mechanically engage the container in the docking station, for example helping to prevent the container from inadvertently being pulled out of the docking station while discharging its contents.

By configuring the chemical dispensing docking station to pierce and retain the container of chemical to be dispensed, the chemical dispensing docking station may provide a safe, non-contact transfer of chemical product out of the container in which it is stored and into the inner strainer basket and/or outer reservoir. In some implementations, a closed container of chemical—for example, a container of chemical with its cap removed and a closure film maintaining a seal over the outlet opening of the container—can be inserted into the chemical dispensing docking station. The container of chemical is opened after it is inserted into the chemical dispensing docking station, e.g., by the piercing member piercing the seal over the outlet opening. The retention member engages the container of chemical, e.g., to hold the container of chemical in the docking station while the contents are transferring out of the container. In this way, the likelihood that the user of the system is inadvertently exposed to chemical during transfer is reduced or eliminated. In some applications, the user may be authorized to transfer chemical using the chemical dispensing docking station without donning any special personal protective equipment and/or perform the transfer at a location that does not have an eye wash station.

A strainer basket system with reservoir, strainer basket, and chemical dispensing docking station according to the disclosure can be used for any desired application. As one non-limiting example, the strainer basket system may be used to prepare human-consumable food, such as fruit or vegetables, within a food preparation environment, such as a restaurant. In use, a food preparer may position the strainer basket inside of the reservoir and place the food to be washed inside of the strainer basket. The food preparer may take a cap off a container of concentrated chemical, exposing a film covering an opening of the container. The food preparer can then insert the container into the chemical dispensing docking station. As the container is being inserted into the chemical dispensing docking station, a piercing member of the docking station may pierce the film.

Prior to, concurrent with, and/or after the piercing member piercing the film, a retention member on the docking station may engage the container to hold the container in the docking station. For instance, in one example, the retention member may simultaneously engage with the container of concentrated chemical as the container is pierced by the piercing member. In another example, the user may insert the container of concentrated chemical into the chemical dispensing docking station to pierce the container and then pull the container of concentrated chemical back off the piercing member (e.g., a short distance) to engage the container with the retention mechanism. Pulling the container of concentrated chemical off the piercing member can remove the piercing member from the hole created into the container, increasing the flow rate of the chemical out of the hole for quicker discharge.

In any case, the contents of the container may be released and dispensed into the reservoir and/or strainer basket. The food preparer can add water to the strainer basket system (before and/or after dispensing the concentrated chemical), forming a diluted solution. For example, the diluted solution may be an antimicrobial wash solution for washing the food. In either case, the food preparer may or may not agitate the food within the strainer basket and then pull the strainer basket out of the reservoir, allowing residual solution to drain out of the strainer basket and leaving the washed food for subsequent use.

In one example, a strainer basket system is described that includes a reservoir, a strainer basket, and a chemical dispensing docking station. The reservoir defines an opening through which material can be introduced into the reservoir. The strainer basket is positioned inside of the reservoir and removable therefrom. The chemical dispensing docking station has a discharge aperture positioned to discharge chemical to be dispensed in at least one of the reservoir and the strainer basket. The example further specifies that the chemical dispensing docking station includes a cavity, a retention mechanism, and a piercing mechanism. The cavity is cavity configured to receive a container of chemical to be dispensed. The retention mechanism is configured to mechanically engage the container of chemical, when inserted into the cavity, and retain the container of chemical in the chemical dispensing docking station during dispensing. The piercing member is positioned to pierce the container of chemical as the container of chemical is inserted into the cavity, thereby releasing chemical to be dispensed through the discharge aperture.

In another example, a chemical dispensing docking station for a strainer basket assembly is described. The chemical dispensing docking station includes an upward-extending sidewall and a bottom wall which, collectively, define a cavity configured to receive a container of chemical to be dispensed, the bottom wall having a discharge aperture. The chemical dispensing docking station also includes a retention mechanism and a piercing member. The retention mechanism is configured to mechanically engage the container of chemical, when inserted into the cavity, and hold the container of chemical in the chemical dispensing docking station during dispensing. The piercing member is positioned to pierce the container of chemical as the container of chemical is inserted into the cavity, thereby releasing chemical to be dispensed through the discharge aperture.

In another example, a method of dispensing chemical into a strainer basket system is described. The method includes adding a material to be processed into a strainer basket that is positioned inside of a reservoir and dispensing a chemical into the strainer basket. The method specifies that dispensing the chemical includes inserting a container of the chemical into a receiving cavity of a chemical dispensing docking station having a discharge aperture positioned to discharge chemical to be dispensed in at least one of the reservoir and the strainer basket. The process of dispensing the chemical further includes engaging the container with a retention mechanism of the chemical dispensing docking station and piercing the container with a piercing member of the chemical dispensing docking station, thereby dispensing the chemical from the container into the strainer basket.

The details of one or more examples are set forth in the accompanying drawings and the description below. Other features, objects, and advantages will be apparent from the description and drawings, and from the claims.

BRIEF DESCRIPTION OF DRAWINGS

FIG. 7A is an expanded view of an example piercing member arrangement that can be used on the docking station in the system of FIG. 1.

DETAILED DESCRIPTION

Figure 1:
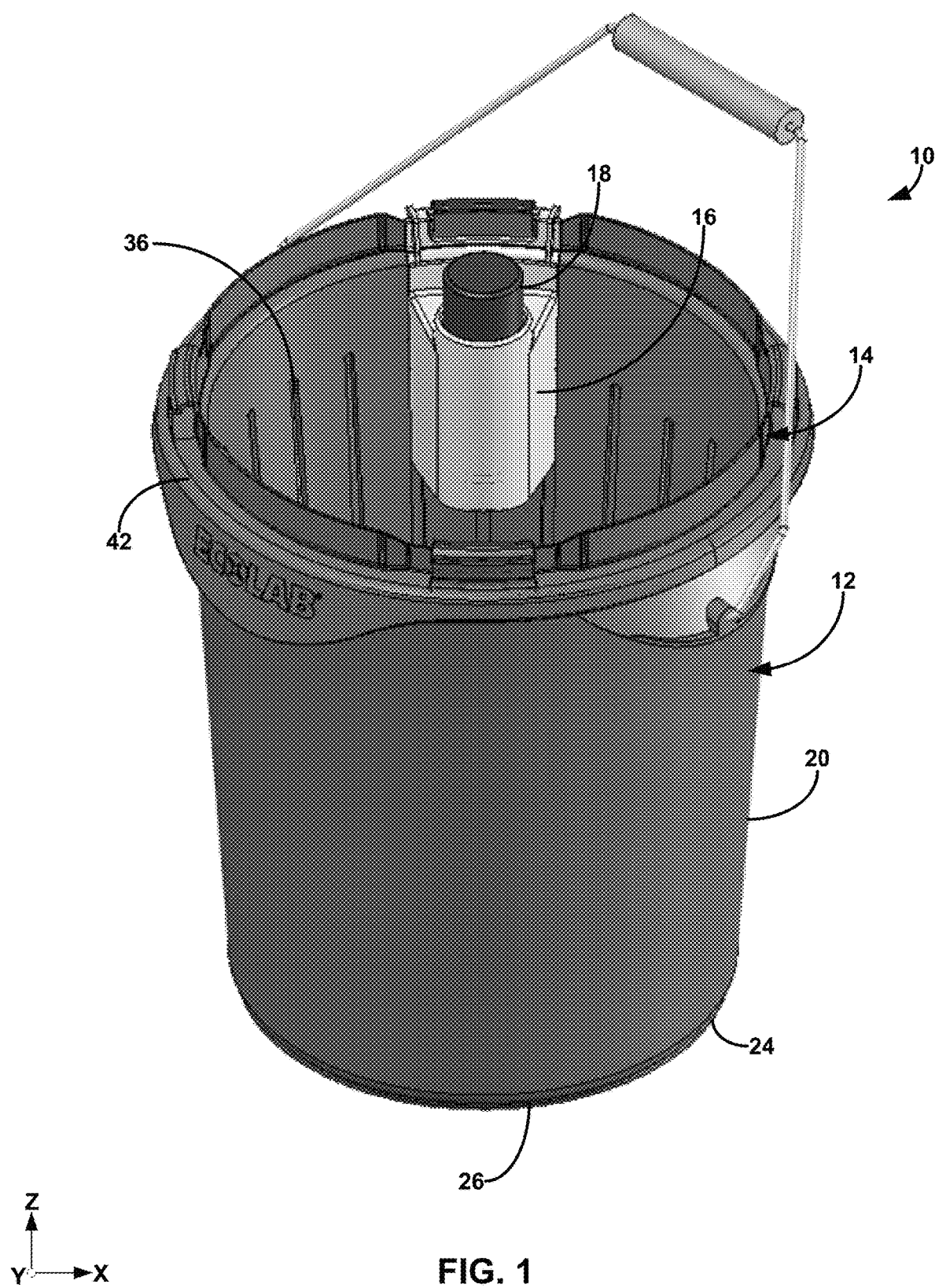
FIGS. 1 and 2 are perspective and exploded views, respectively, of an example strainer basket system according to the disclosure.

In general, this disclosure relates to a strainer basket system with chemical dispensing docking station for transferring chemical into a strainer basket assembly. The chemical dispensing docking station may provide safe, non-contact transfer of chemical product out of the container in which it is stored into the strainer basket assembly. In some implementations, the chemical dispensing docking station defines a cavity sized and/or shaped to that of the container to be inserted into the station. As the container is inserted into the receiving cavity, the container may be pierced by a piercing member, releasing the contents of the container to flow through a discharge aperture of the docking station and into the strainer basket assembly. Further, the docking station can include a retention mechanism. The retention mechanism may engage the container in the receiving cavity, e.g., to prevent the container from being inadvertently removed from the cavity after being pierced by the piercing mechanism and while still discharging chemical. In some implementations, the container engages the retention mechanism as the piercing mechanism pierces the container and/or the retention mechanism may engage the container after the piercing mechanism pierces the container (e.g., as a user pulls the container off the piercing mechanism to increase flow rate through the hole created in the container by the piercing mechanism).

The chemical dispensing docking station can have a variety of different configurations. In some examples, the chemical dispensing docking station is attachable to and detachable from the strainer basket and/or reservoir in which the strainer basket is positioned. For example, the chemical dispensing docking station may be clipped into a sidewall and/or edge of the strainer basket and/or reservoir. In other examples, the chemical dispensing docking station may be permanently integrated into the structure of the strainer basket and/or reservoir. For example, the chemical dispensing docking station may be molded or otherwise permanently integrated into a sidewall of the strainer basket or reservoir. When so configured, the chemical dispensing docking station may project inwardly or outwardly relative to a remainder of the sidewall defining the strainer basket or reservoir.

Independent of the specific configuration of the chemical dispensing docking station, the docking station may define a discharge aperture (also referred to as a discharge opening) through which chemical being dispensed exits the docking station. The discharge aperture can be positioned below the uppermost edges of the strainer basket and reservoir. In other words, the discharge aperture of the chemical dispensing docking station may be positioned inside of the strainer basket and/or reservoir. This positioning can help ensure that chemical exiting the discharge aperture flows directly into the strainer basket and/or reservoir without splashing or spilling outside of the assembly. This can minimize that likelihood that a user of the strainer basket system is exposed to chemical being dispensed.

Figure 2:
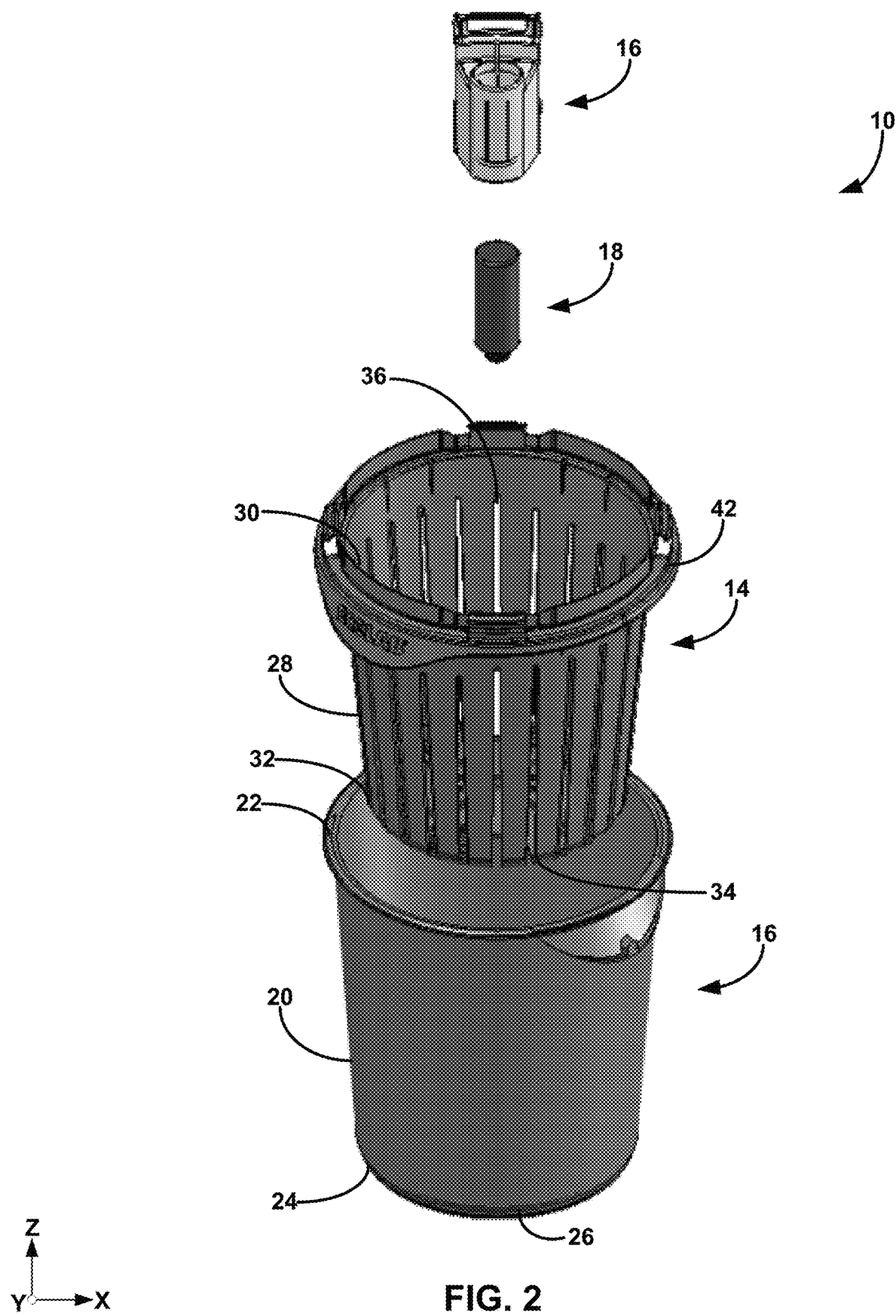

FIGS. 1 and 2 are perspective and exploded views, respectively, of an example strainer basket system 10 that includes a reservoir 12, a strainer basket 14, and a chemical dispensing docking station 16 (also referred to as "docking station 16" herein). Chemical dispensing docking station 16 is configured to receive a container 18 of chemical to be dispensed using the docking station into reservoir 12 and/or strainer basket 14. In use, an operator can insert container 18 into docking station 16. Docking station 16 can have various features that temporarily lock the container in the docking station 16 and pierce the container to dispense its contents. This combination of features may help prevent container 18 from releasing its contents until it is positioned at least partially into an interior of reservoir 12 and/or strainer basket 14 and may also help the container from being withdrawn from the docking station before it has discharged its entire contents.

Strainer basket system 10 in FIGS. 1 and 2 includes reservoir 12 and strainer basket 14. Material to be processed in system 10 can be inserted into strainer basket 14, e.g., before or after introducing chemical from container 18 into the system using docking station 16. Strainer basket 14 can have holes that allow liquid to pass through the basket while solid material to be processed is retained in the basket. For example, in use, reservoir 12 can be filled with a diluent (e.g., water) and concentrated chemical introduced into the reservoir via docking station 16 to form a diluted use solution. Material to be processed can further be added to strainer basket 14, causing the material to be exposed to the use solution within reservoir 12. After suitably contacting the material with the use solution, strainer basket 14 can be pulled out of reservoir 12 (e.g., as illustrated in FIG. 2) to extract the processed material from the residual use solution.

In general, reservoir 12 may be any structure configured to receive and hold strainer basket 14 and liquid for processing material placed in the reservoir and/or strainer basket. For example, reservoir 12 may define a bounded cavity that separates the contents therein from the external environment. Reservoir 12 may be formed by at least one sidewall 20 that extends from a terminal top end 22 to a terminal bottom end 24. Reservoir 12 can have a closed bottom wall 26 that joins sidewall 20 at bottom end 24 of the sidewall. The top end 22 of sidewall 20 can define an opening into which strainer basket 14 is inserted into and removable from.

It should be appreciated that the descriptive terms "top" and "bottom" with respect to the configuration and orientation of components described herein are used for purposes of illustration based on the orientation in the figures. The arrangement of components in real world application may vary depending on their orientation with respect to gravity. Accordingly, unless otherwise specified, the general terms "first" and "second" may be used interchangeably with the terms "top" and "bottom" without departing from the scope of disclosure.

In the example of FIG. 1, reservoir 12 includes at least one sidewall 20. Sidewall 20 extends upwardly (in the Z-direction indicated on FIG. 1) from bottom end 24. The number of sidewalls interconnected together to form the side structure of reservoir 12 extending between the top and 22 and bottom end 24 may vary depending on the shape of the reservoir. For example, a reservoir with a circular cross-sectional shape (e.g., in the X-Y plane) may be formed of a single sidewall whereas a reservoir with a square or rectangular cross-sectional shape may be defined by four interconnected sidewalls.

In general, reservoir 12 can define any polygonal (e.g., square, hexagonal) or arcuate (e.g., circular, elliptical) shape, or even combinations of polygonal and arcuate shapes. In some examples, such as the example shown in FIG. 1, reservoir 12 is illustrated as having a circular cross-sectional shape. Reservoir 12 can be fabricated from a material that is chemically compatible with and chemically resistant to the type of chemical placed in the reservoir. In some examples, reservoir 12 is fabricated from a polymeric material, such as a molded plastic. In other examples, reservoir 12 is fabricated from a metal, such as aluminum or steel.

Strainer basket 14 is illustrated in FIGS. 1 and 2 as being insertable into and removable from reservoir 12. Similar to reservoir 12, strainer basket 14 may be formed by at least one sidewall 28 (FIG. 2) that extends from a terminal top end 30 to a terminal bottom end 32. Strainer basket 14 can have a bottom wall 34 that joins sidewall 28 at bottom end 32 of the sidewall. The top end 30 of sidewall 28 can define an opening into which material to be processed can be inserted into strainer basket 14 and removed therefrom. In some implementations, the top end 30 of sidewall 28 defines a round edge instead of a planar edge with 90 degree corners. Such a rounded edge may be easier to clean and less susceptible to contaminant accumulation than a planar edge.

In the example of FIG. 1, sidewall 28 of strainer basket 14 extends upwardly (in the Z-direction indicated on FIG. 1) from bottom end 32. The number of sidewalls interconnected together to form the side structure of strainer basket 14 extending between the top and 30 and bottom end 32 may vary depending on the shape of the reservoir. For example, a strainer basket with a circular cross-sectional shape (e.g., in the X-Y plane) may be formed of a single sidewall whereas a strainer basket with a square or rectangular cross-sectional shape may be defined by four interconnected sidewalls.

In general, strainer basket 14 can define any polygonal (e.g., square, hexagonal) or arcuate (e.g., circular, elliptical) shape, or even combinations of polygonal and arcuate shapes. Strainer basket 14 may typically be shape-indexed to a shape of reservoir 12. For example, strainer basket 14 may have a same general shape as reservoir 12 but a slightly smaller size (e.g., in the X-Y plane indicated on FIGS. 1 and 2) than the reservoir, allowing the strainer basket to be nested inside of the reservoir. In FIGS. 1 and 2, strainer basket 14 and reservoir 12 are both illustrated as having a circular cross-sectional shape. Of course, strainer basket 14 may have a shape different than reservoir 12 without departing from the functionality of the strainer basket described herein. Similar to reservoir 12, strainer basket 14 can be fabricated from a material that is chemically compatible with and chemically resistant to the type of chemical placed in the reservoir. In various examples, strainer basket 14 is fabricated from a polymeric material, such as a molded plastic, or a metal, such as aluminum or steel.

Unlike reservoir 12, which has a closed sidewall 20 and bottom wall 26 to prevent liquid from flowing through the wall surfaces, strainer basket 14 includes at one or more openings 36 through which liquid can flow into and out of the strainer basket. In the configuration of FIGS. 1 and 2, strainer basket 14 is illustrated as having a plurality of vertically elongated openings (e.g., having a length in the Z-direction greater than a width in the X-Y plane) arrayed about a perimeter of the strainer basket. Strainer basket 14 can have a different arrangement, number, or configuration of openings without departing from the disclosure. In general, openings 36 may be sized smaller a size of the material to be processed in strainer basket system 10 to present the material from passing through the openings in the basket during use.

In use, strainer basket 14 can be positioned inside of reservoir 12. Strainer basket 14 may be configured (e.g., sized and/or shaped) to nest down inside of reservoir 12 to a depth sufficient to position openings 36 in the strainer basket below top edge 22 of reservoir 12. This can prevent liquid from flowing over the top edge of the reservoir. In some configurations, strainer basket 14 is positioned inside of reservoir 12 with the bottom surface of bottom wall 32 of the strainer basket positioned in contact with the top surface of the bottom wall 26 of the reservoir. In other configurations, strainer basket 14 may be positioned inside reservoir 12 with the bottom surface 32 of the strainer basket elevated above the bottom surface 26 of reservoir 12. For example, strainer basket 14 may be positioned inside of reservoir 12 with a separation gap between the bottom surface of bottom wall 32 of the strainer basket in the top surface of the bottom wall 26 of the reservoir. The separation gap may allow liquid to flow between the bottom surfaces of the reservoir and strainer basket, e.g., to promote mixing of the chemical dispensed from container 18 with a diluent added to the reservoir.

Figure 3:
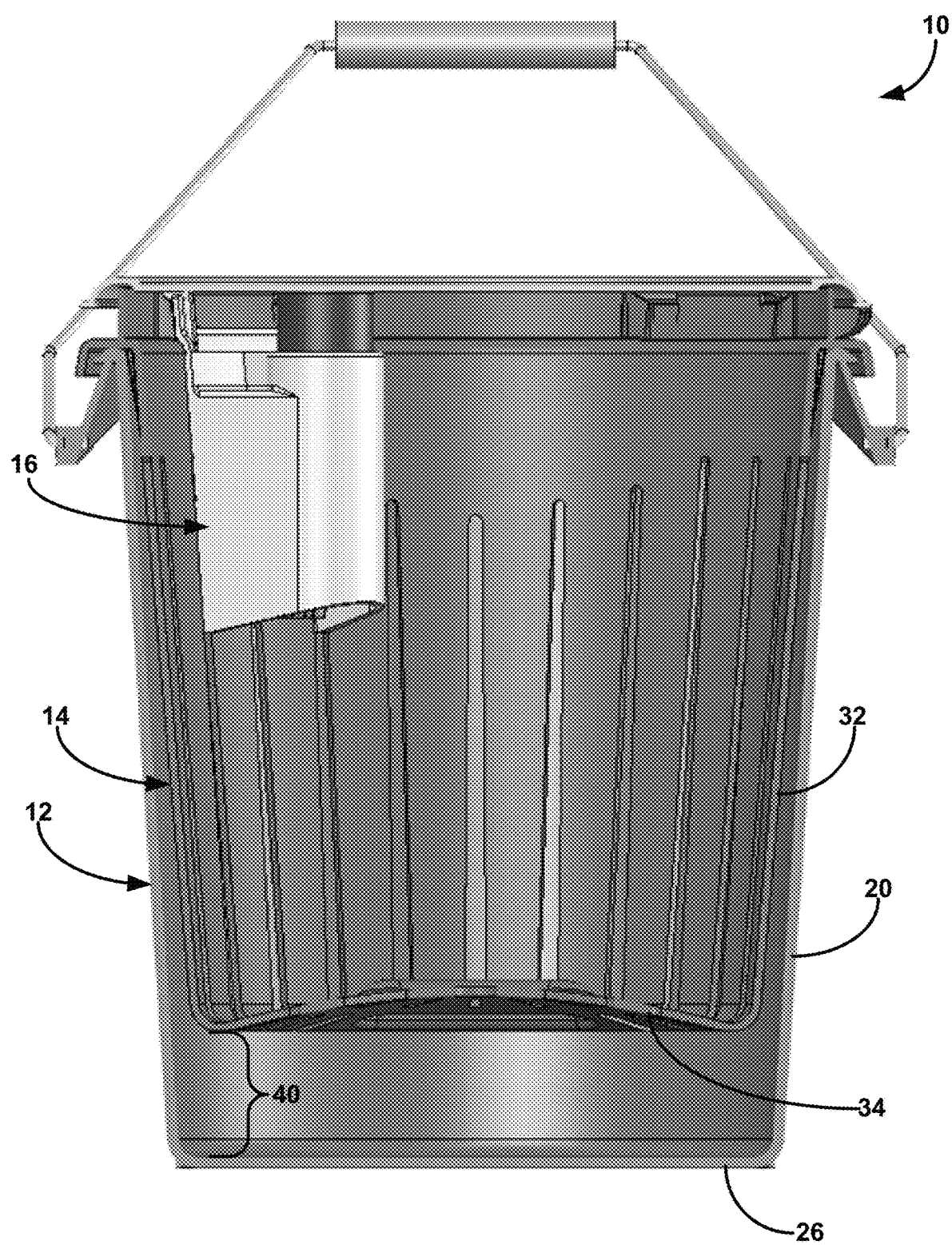
FIG. 3 is a sectional view of the example strainer basket system from FIG. 1 illustrating an example offset between a bottom wall the strainer basket and the bottom wall of the reservoir.

FIG. 3 is a sectional view of strainer basket system 10 from FIG. 1 illustrating an example offset 40 between the bottom surface of bottom wall 32 of strainer basket 14 and the top surface of bottom wall 26 of reservoir 12. When bottom wall 32 of strainer basket 14 and/or bottom wall 26 of reservoir 12 are not planar, offset 40 may be measured at a location of minimal separation between the respective walls bottom walls. The distance defined by offset 40 may vary depending on the configuration and size of strainer basket system 10. In some examples, offset 40 is less than 50 cm, such as less than 25 cm, less than 12 cm, less than 10 cm, less than 5 cm, less than 2.5 cm, or less than 1 cm. For example, offset 40 may range from 0.5 cm to 50 cm, such as from 1 cm to 25 cm. In other examples, the bottom surface of bottom wall 32 of strainer basket 14 contacts the top surface of bottom wall 26 of reservoir 12 such that offset 40 is zero. In some implementations, such as when using comparatively viscous chemicals, offset 40 may be minimized to improve mixing of the concentrated chemistry dispensed toward to bottom wall 26 of reservoir 12 throughout the reservoir and strainer basket (and contents therein).

With further reference to FIGS. 1 and 2, strainer basket 14 is illustrated as having an outwardly extending lip or ridge 42, which extends outwardly from sidewall 28. Outwardly extending lip 42 may extend partially or fully about a perimeter of strainer basket 14 and be configured to be positioned over top edge 22 of reservoir 12. Accordingly, when strainer basket 14 is positioned inside of reservoir 12, outwardly extending lip 42 can rest on the top edge 22 of reservoir 12, e.g., to hold the strainer basket in the reservoir while maintaining offset 40. In addition, outwardly extending lip 42 may define a handle or gripping area external of reservoir 12, which may provide a convenient location for a user to grasp strainer basket 14 without contacting chemical therein for pulling the strainer basket out of the reservoir. In other configurations, strainer basket 14 may be positioned entirely inside of reservoir 12, e.g., with the top edge 30 of strainer basket 14 positioned below the top edge 22 of reservoir 12, rather than resting on a top edge or surface of the reservoir.

While system 10 in the present disclosure is described as including reservoir 12 and strainer basket 14, in other implementations of docking station 16 according to the disclosure, the docking station may be used with a reservoir 12 that does not include a strainer basket. For example, docking station 16 may be used with reservoir 12 to form a dilute use solution in applications where a strainer basket 14 is not needed. Example implementations include situations where reservoir 12 is a sink, a mop bucket, or other reservoir that does not utilize a strainer basket.

As briefly introduced above, strainer basket system 10 includes docking station 16 that is configured to receive a container 18 of chemical to be dispensed into the system. In different implementations, docking station 16 can be fabricated as a separate component from reservoir 12 and/or strainer basket 14 that can then be engaged or interlocked with one or both components. Alternatively, docking station 16 may be permanently integrated into reservoir 12 and/or strainer basket 14, e.g., by molding the features together, permanently joined the features together such that the features cannot be detached without damaging the features, or otherwise inseparably integrating the docking station with the reservoir and/or strainer basket.

In the example of FIGS. 1 and 2, docking station 16 is illustrated as being removable from but interlockable with reservoir 12 and/or strainer basket 14. Alternative configurations in which docking station 16 is molded with strainer basket 14 are discussed with respect to FIGS. 8A, 8B, and 9 below. The features and functionalities described as being attributable to docking station 16 herein can be used on either a detachable/removal configuration of the docking station or a permanently integrated configuration of the docking station. Accordingly, discussion of certain features or functionalities of docking station 16 with respect to one embodiment should be understand as being applicable to other embodiments herein and not limited to the specific embodiment with which the features or functionalities are described.

Figure 5:
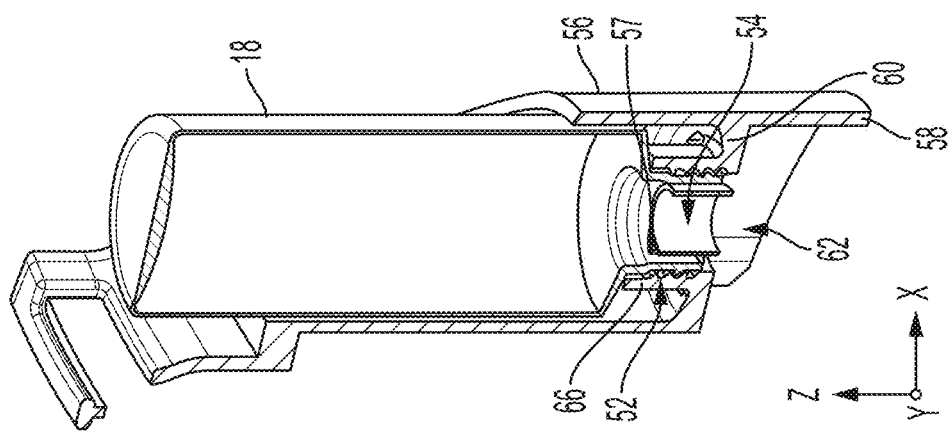
FIG. 5 is a sectional view of the example docking station from FIG. 4 illustrated with a container of chemical positioned in the docking station.
Figure 4:
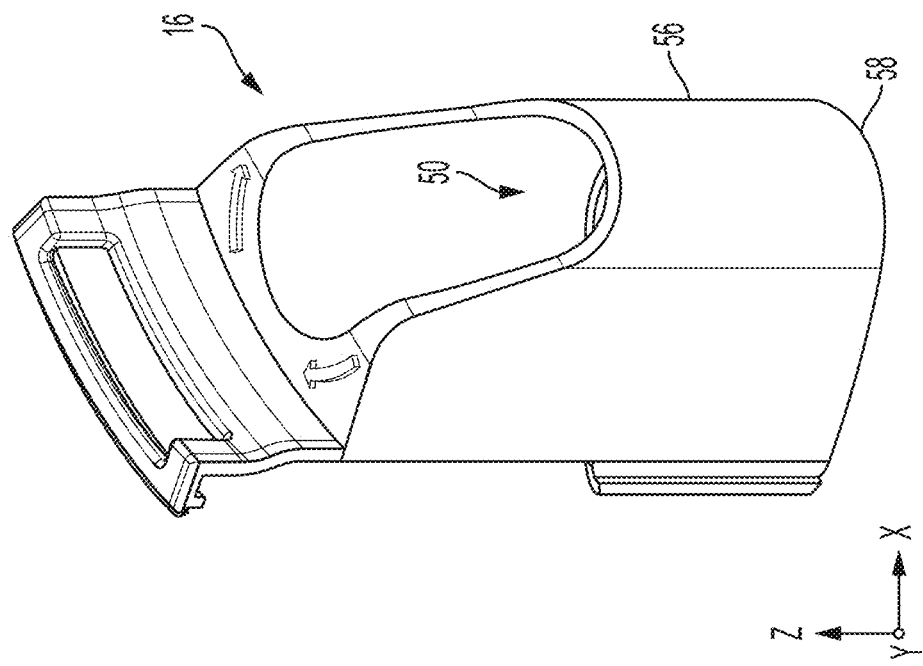
FIG. 4 is a perspective view of an example docking station that can be used in the system of FIGS. 1 and 2.

FIGS. 4 and 5 are illustrations of an example configuration of docking station 16 that can be used in a strainer basket system 10, such as that described with respect to FIGS. 1 and 2, herein. FIG. 4 is a perspective view of docking station 16 without container 18 of chemical inserted in the docking station. FIG. 5 is a sectional view of docking station 16 from FIG. 4 illustrated with container 18 of chemical positioned in the docking station. In the illustrated configuration, docking station 16 defines a cavity 50 into which container 18 can be inserted. Docking station 16 is also illustrated as including a retention mechanism 52 that is configured to mechanically engage container 18, when the container is inserted into the cavity 50, and hold the container of chemical in the docking station during dispensing. Docking station 16 is further illustrated as including a piercing member 54 that is positioned to pierce container 18, when the container is inserted into cavity 50.

In general, cavity 50 may be an opening or void space in docking station 16 into which container 18 can be inserted. Docking station 16 can include a sidewall 56 that extends upwardly (in the Z-direction indicated on FIGS. 4 and 5) from a bottom end 58 and defines the cavity. Docking station 16 may also include a bottom wall 60 (FIG. 5) in which a discharge opening 62 is formed and through which chemical dispensed from container 18 can discharge from the docking station.

Cavity 50 may or may not be shape indexed to a shape of container 18. For example, cavity 50 may have a shape complementary to the shape of the container 18 intended to be inserted into the cavity. In FIGS. 4 and 5, cavity 50 is illustrated as define a circular cross-sectional shape to receive a container 18 that is circular shaped. However, cavity 50 can define any polygonal (e.g., square, hexagonal) or arcuate (e.g., circular, elliptical) shape, or even combinations of polygonal and arcuate shapes.

The depth of cavity 50 (in the Z-direction indicated on FIGS. 4 and 5) can vary based on a variety factors, such as the size of container 18 intended to be inserted into the cavity and the amount of the container desired to project out of the cavity. For example, sidewall 56 may extend partially or fully along the length of container 18, e.g., such that the container can be partially or fully inserted into cavity 50. In some configurations, cavity 50 is of comparatively shallow depth so only a distal end or a distal tip of container 18 is insertable into the cavity. In other configurations, cavity 50 is comparatively deep so that an entire length of the container can be inserted in the cavity. In the illustrated arrangement, cavity 50 has a variable depth across its cross-section (in the X-Y plane) such that the rearward side of the cavity is deeper than the frontward side.

In practice, a chemical provider may supply different chemicals in similar reservoirs that are intended to be deployed for different applications. To help ensure that the end user does not inadvertently dispense the wrong chemical using strainer basket system 10, a system of different docking stations 16 may be provided where each docking station defines a cavity 50 of different size and/or shape than the cavity of each other docking station. Each container 18 configured to be inserted into a specific cavity 50 of the system of docking stations may be incompatible with each other docking station configuration, e.g., such that a user cannot successfully insert an incorrect container into a docking station intended to receive a container containing a different type of chemical product.

In the illustrated configuration, container 18 is inserted into cavity 50 of docking station 16 by moving the container downwardly (in the negative Z-direction indicated on FIGS. 4 and 5). In other configurations, container 18 may be inserted into docking station 16 from the side (e.g., by moving the container in the X-direction and/or Y-direction indicated on FIGS. 4 and 5). In these alternative configurations, cavity 50 may have a different orientation relative to the longitudinal axis of reservoir 12 and strainer basket 14, e.g., while still positioning outlet opening 62 inside of the reservoir and/or strainer basket.

To help prevent container 18 from inadvertently detaching from docking station 16 while dispensing chemical product, the container may be locked (reversibly or irreversibly) to the docking station. For these and other reasons, docking station 16 may include a retention mechanism 52. Retention mechanism 52 may be a feature that mechanically engages container 18, when the container is partially or fully inserted into cavity 50 (e.g., to the maximum depth allowed by the cavity or less than a maximum depth allowed by the cavity). Retention mechanism 52 can hold container 18 in the cavity while the container is dispensing its contents. For example, retention mechanism 52 can provide an engagement force to container 18 that prevents the container from being inadvertently pulled out of strainer basket system 10 while the container is dispensing its contents, which can lead to a spill.

Retention mechanism 52 can be implemented using a variety of different features. In the example illustrated in FIG. 5, retention mechanism 52 is shown as a threaded connection between docking station 16 and container 18. For example, retention mechanism 52 may be implemented by positioning threading encircling (extending about a perimeter of) discharge aperture 62 of docking station 16. The threading of the docking station can engage with complementary threading on container 18, when the container is inserted into cavity 50. To insert container 18 into docking station 16 in such an example, the container may be inserted vertically downwardly until the container contacts a wall surface defining the threading and thereafter rotated to engage the threaded connection between the docking station and the container. As a container is threaded into the docking station, the container can move vertically further vertically downwardly into the cavity.

Figure 6B:
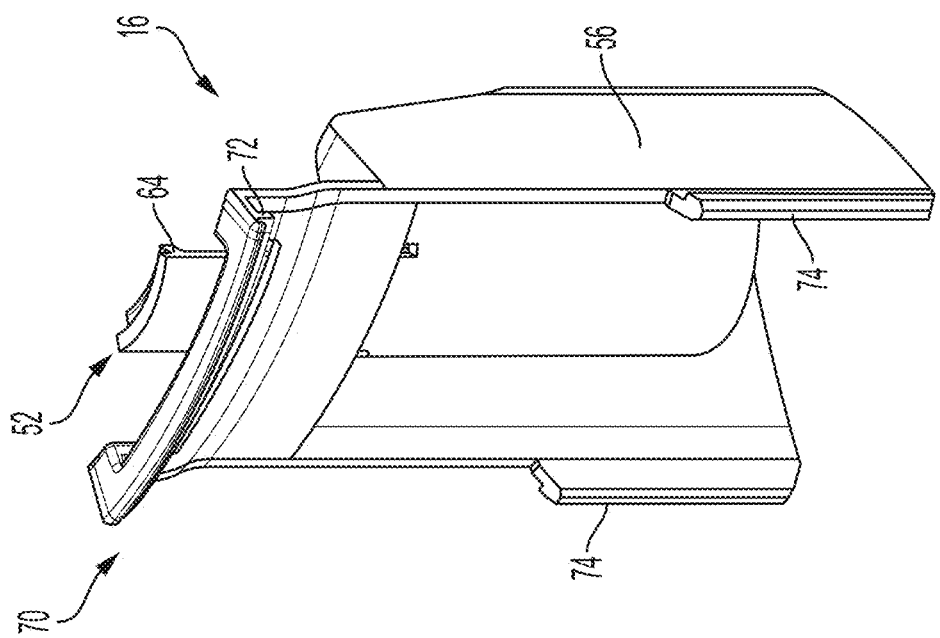
FIGS. 6A and 6B example configurations of retention mechanisms that can be used on the docking station in the system of FIG. 1.
Figure 6A:
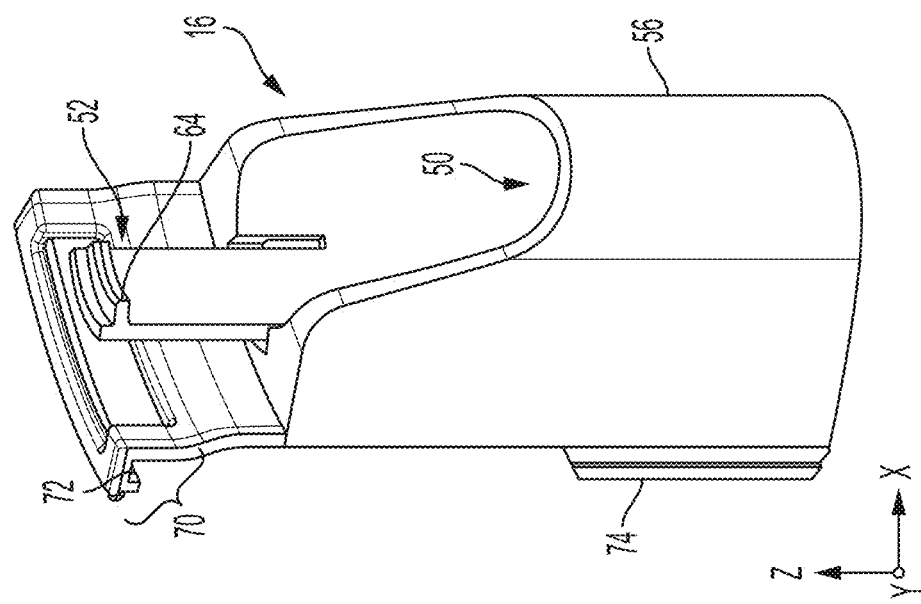

FIGS. 6A and 6B illustrate another configuration of retention mechanism 52 that can be used on docking station 16, in addition to or in lieu of the threaded connection described with respect to FIG. 5. In the illustrated example of FIGS. 6A and 6B, retention mechanism 52 is illustrated as being implemented with a projection 64 extending at least partially (and in some examples fully) over cavity 50 (in the X-Y plane indicated on FIG. 6A). Projection 64 can be positioned at a height selected based on the length of container 18 intended to be positioned in cavity 50. For example, projection 64 can be positioned at a height configured to engage a bottom surface of container 18, when the container is inserted into cavity 50.

Once container 18 is inserted into cavity 50, projection 64 may extend over at least a portion of the bottom surface of the container (where the bottom surface the container is the surface facing upwardly away from discharge aperture 62). Projection 64 can engage the bottom surface of container 18 by pressing against the bottom surface, when the container is positioned in the cavity. Additionally or alternatively, projection 64 can engage the bottom surface of container 18 by acting as a contact surface or stop that the bottom surface of the container contacts when lifted vertically upwardly out of cavity 50. For example, the bottom surface of container 18 may be offset from projection 64 when the container is fully inserted into the cavity but may contact the projection if the user inadvertently attempts to lift the container out of the cavity. In some examples, projection 64 extends from a flexible arm or wall surface, allowing the projection to move in and out of engagement in order to insert and remove container 18 from cavity 50. In other examples, projection 64 extends from an unmovable region of sidewall 56 defining cavity 50.

Other configurations of a retention mechanism 52 can be used in addition to or in lieu of those discussed above. With further reference to FIG. 5, retention mechanism 52 may be implemented by configuring docking station 16 to provide a friction fit between container 18 and the docking station. For example, docking station 16 may include a region (e.g., defined by sidewall 56 and/or an upwardly extending wall 66) into which container 18 or portion thereof is configured to be inserted. For example, instead of having threading as illustrated in FIG. 5, retention mechanism 52 may be defined by a friction fit between container 18 and a region of docking station 16 defined by wall 66 into which the distal tip or end of the container is intended to be inserted. In use, container 18 may be inserted vertically downwardly until the distal end of the container (e.g., defined by a region of narrower cross-section) begins entering discharge aperture 62 defined by wall 66. A user may then provide an axially directed downward force to push the container into the region bounded by sidewall 66, establishing a frictional engagement between docking station 16 and container 18.

Independent of the configuration of retention mechanism 52, the retention mechanism can engage container 18 to retain the container and prevent the container from being inadvertently pulled out of strainer basket system 10 while the container is dispensing its contents. Depending on the relative positioning and configuration of retention mechanism 52 and piercing member 54, container 18 may engage retention mechanism 52 before, during, and/or after being pierced by piercing member 54. For example, retention mechanism 52 may be positioned relative to piercing member 54 such that container 18 engage the retention mechanism as the container is being punctured by piercing member 54. In some such implementations, the user inserts container 18 to a maximum depth into cavity 50, causing the piercing member 54 to penetrate the container. Retention mechanism 52 may hold the container at the maximum insertion depth in the cavity, e.g., with piercing member 54 projecting into container 18.

In other examples, retention mechanism 52 may be positioned relative to piercing member 54 such that the retention mechanism engages (e.g., contact) container 18 when the container is not inserted to a maximum depth into cavity 50. For example, retention mechanism 52 may be offset from piercing member 54 a distance effective to allow the container of chemical to be pierced by the piercing member and then be withdrawn off the piercing member before and/or while engaging the retention mechanism. In some such implementations, the user inserts container 18 to a maximum depth into cavity 50, causing the piercing member 54 to penetrate the container and then withdraws the container off the piercing member (e.g., partially but not fully retracting container 18 upwardly in cavity 50). Retention mechanism 52 can help prevent container 18 from being fully withdrawn from cavity 50 is such configurations but allow the container to be withdrawn off piercing member 54, e.g., such that the piercing member is offset from and/or does not project into container 18. This can remove piercing member 54 from the hole created in container 18 by the piercing member upon initial insertion, e.g., to increase the flow rate of the concentrated chemical out of the hole created in the container as compared to when the chemical needs to flow through and/or are the piercing member in the hole.

Figure 6D:
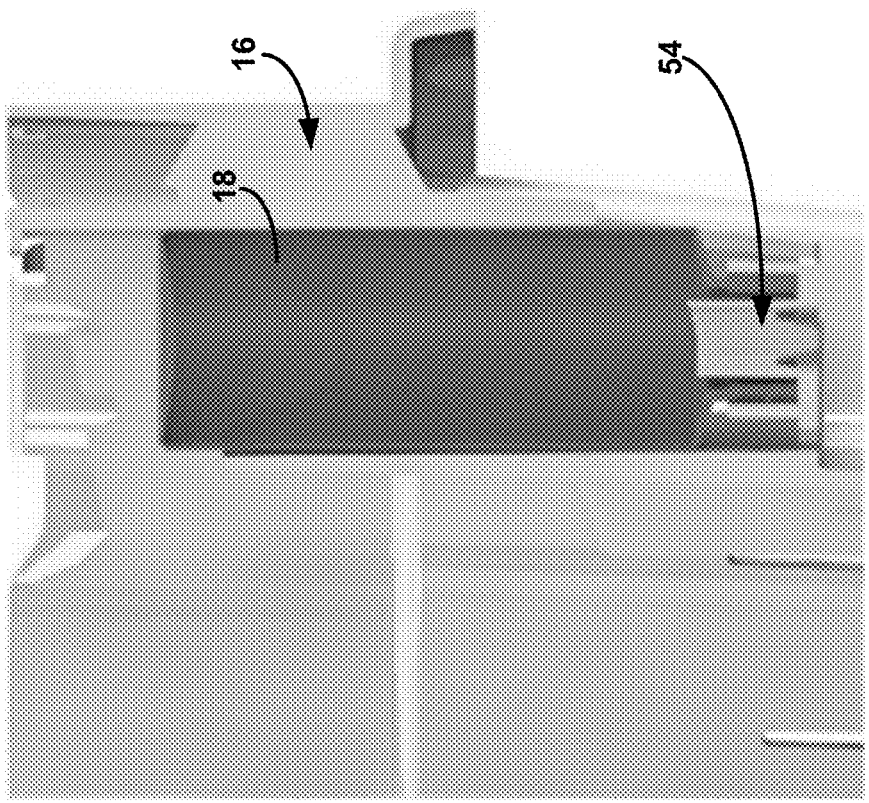
FIGS. 6C-6F illustrate an example configuration of a retention mechanism in which the retention mechanism is arranged to allow the container to be pulled off the piercing member after being punctured.
Figure 6C:
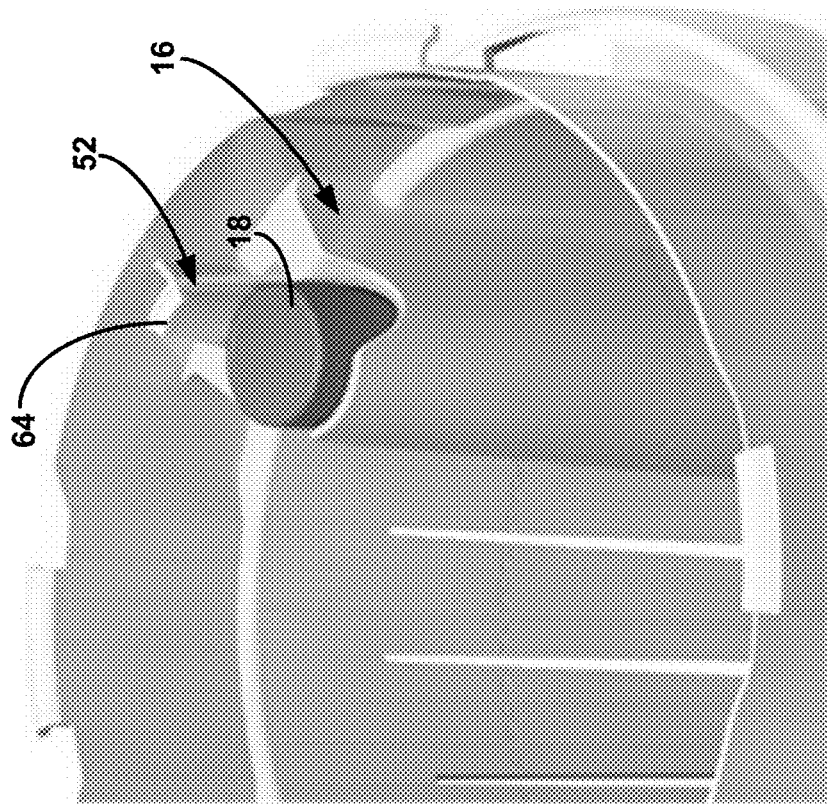

FIGS. 6C-6F illustrate an example arrangement of retention mechanism 52 in which the retention mechanism is arranged relative to piercing member 54 to allow the container to be pulled off the piercing member after being punctured. In particular, FIGS. 6C and 6D are top and side views, respectively, showing retention mechanism 52 implemented with a projection 64 extending at least partially over cavity 50 (e.g., as discussed above with respect to FIGS. 6A and 6B). As shown in FIGS. 6C and 6D, container 18 is inserted to a maximum depth into the receiving cavity of docking station 16, causing piercing member 54 to pierce the container 18 for discharging its contents. When so positioned, piercing member 54 is positioned in an interior of container 18, requiring chemical to flow through and/or around piercing member 54 to exit the hole created by the piercing member.

Figure 6F:
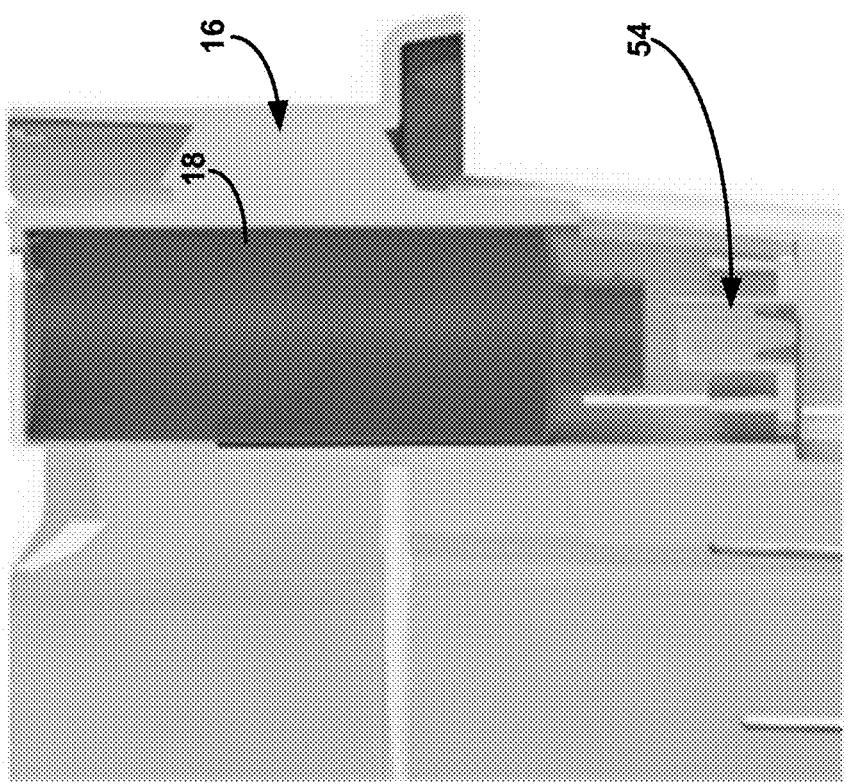
Figure 6E:
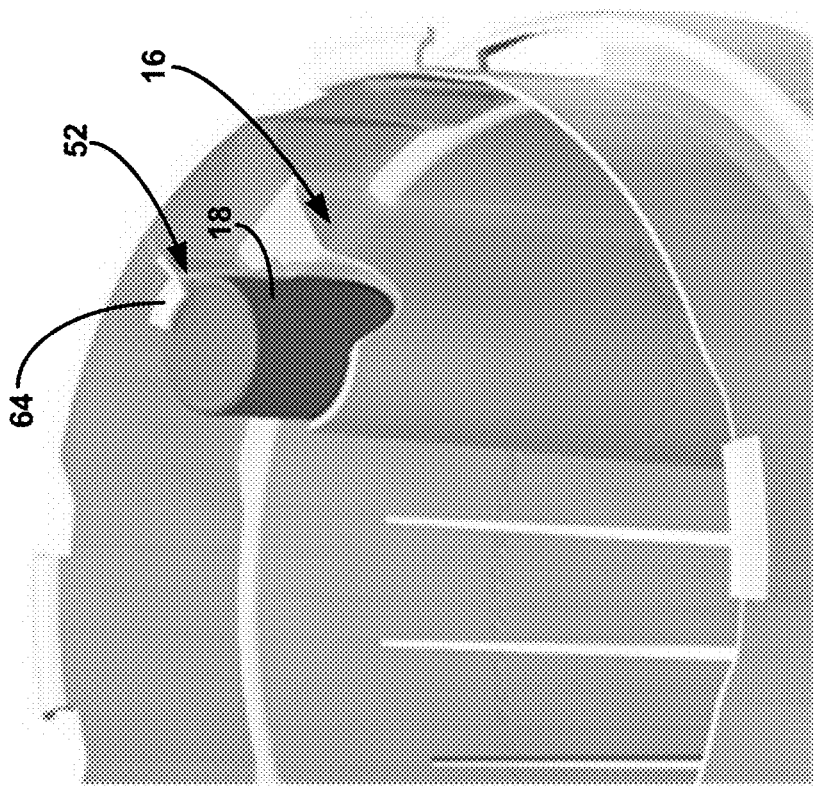

FIGS. 6E and 6F are top and side views, respectively, showing the retention mechanism and piercing member arrangement of FIGS. 6C and 6D with container 18 withdrawn off piercing member 54. In use, the user can insert container 18 into the receiving cavity of docking station 16, as shown in FIGS. 6C and 6D, causing piercing member 54 to pierce the container 18 for discharging its contents. After piercing member 54 pierces container 18, the container can be pulled back off of piercing member 54, e.g., until a bottom surface of the container contacts retention projection 64 defining retention mechanism 52. By withdrawing container 18 off of piercing member 54, the piercing member may no longer be positioned inside of the container. Rather, the distal end of piercing member 54 may be offset from the hole created in container 18 a distance, such as at least 1 mm, at least 2 mm, or at least 5 mm. The separation distance between the distal end of piercing member 54 and the hole created in container 18 may be set by controlling the position of retention mechanism 52 (e.g., projection 64) relative to piercing member 54 and the length of container 18 intended to be used. In either case, the separation distance may increase the discharge rate out of container 18, e.g., by removing the physical obstruction of piercing member 54 from the hole created in the container and/or allowing air to better enter the container to prevent or limit a vacuum.

Figure 6G:
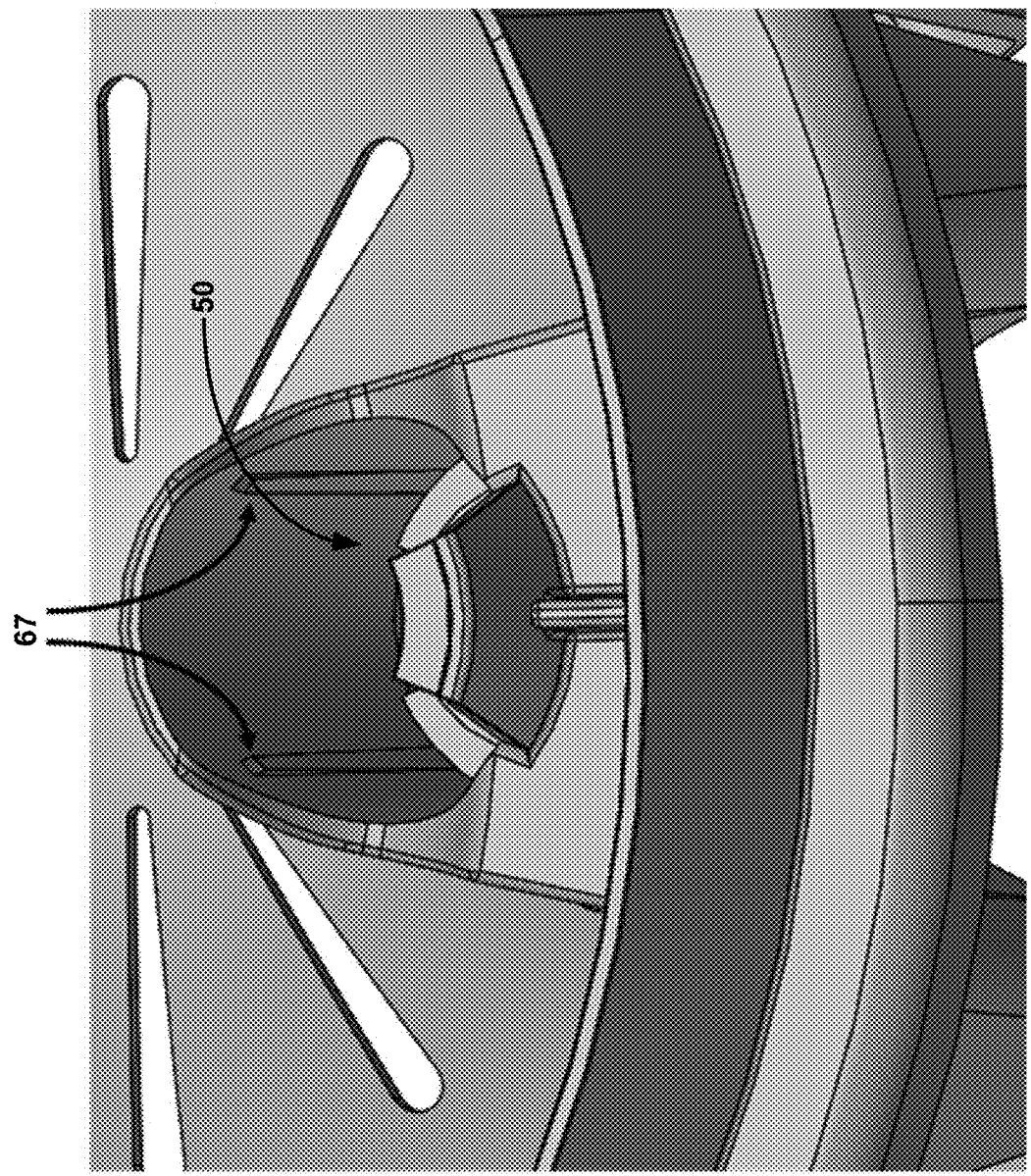
FIGS. 6G and 6H illustrate example features that can be used by a docking station to hold a container above a piercing member.
Figure 6H:
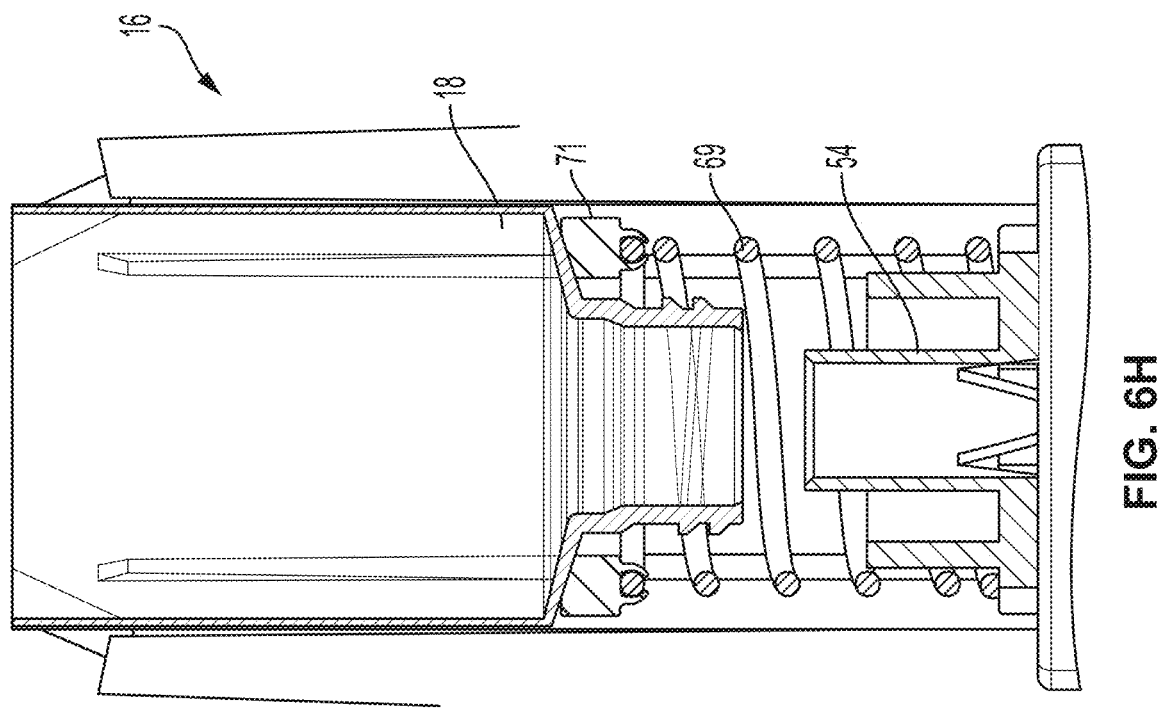

In some examples in which docking station 16 is configured to allow container 18 to be withdrawn from piercing member 54 during dispensing, the docking station may include one or more features to help hold the container vertically above the piercing member (e.g., in contact with retaining mechanism 52). FIGS. 6G and 6H illustrate example features that can be used by docking station 16 to hold container 18 above piercing member 54.

FIG. 6G is a top view of cavity 50 illustrating one or more example frictional contact features 67 (e.g., ribs) that can frictionally engage with an outer surface of container 18. Frictional contact features 67 can frictionally engage with and hold container 18 above piercing member 54, e.g., in contact with retention mechanism 52. FIG. 6H is a side view of docking station 16 illustrating a biasing member 69 (e.g., spring) positioned to bias container 18 away from piercing member 54. Biasing member 69 can directly contact container 18 or a retaining/contacting ring 71 may be positioned between the biasing member and container. In either case, a user can apply a compressive force to biasing member 69 when inserting container 18 into docking station 16, causing the biasing member to compress and container 18 to be punctured by piercing member 54. When the user stops applying downward force to container 18, biasing member 69 can push container 18 off piercing member 54 and hold the container above the piercing member.

As introduced above in connection with FIG. 5, docking station 16 includes a piercing member 54. Piercing member 54 may be implemented as one or more projections that are positioned and configured to pierce into container 18, e.g., as the container is inserted into cavity 50. Accordingly, container 18 may be inserted into docking station 16 in a closed state but may be pierced by piercing member 54 as the container is inserted into the docking station. As a result, the contents of container 18 may not be release or otherwise be exposed for dispensing until the container has been inserted at least partially (and in some examples to the deepest extent possible possible) into cavity 50 of the docking station. This configuration can be useful to help prevent inadvertent spilling of chemical from container 18, e.g., prior to or concurrent with inserting the container into docking station 16.

FIG. 7A is an expanded view of an example piercing member arrangement that can be used on docking station 16, which is shown without container 18 inserted into the docking station for purposes of illustration. In this configuration, piercing member 54 is positioned extending upwardly through discharge aperture 62. As container 18 is moved axially downwardly into the discharge aperture, piercing member 54 can penetrate into the container to release its contents. Further, while piercing member 54 is shown projecting axially upwardly, piercing member 54 may additionally or alternatively project at a different angle, such as radially inwardly (laterally across the cross-section of docking station 16). In general, piercing member 54 may extend in any direction suitable to puncture container 18, as the container is inserted into docking station 16.

In the specific configuration illustrated in FIG. 7A, discharge aperture 62 of docking station 16 is illustrated as having a smaller cross-sectional area than the entire cross-sectional area of cavity 50 (in the X-Y plane indicated on FIG. 7A). As a result, discharge aperture 62 is smaller than cavity 50. Piercing member 54 is illustrated as extending upwardly and coaxially through discharge opening 62. As a result, when container 18 is pushed toward discharge aperture 62, piercing member 54 can pierce up into the container. The contents of the pierce container can then flow down over and/or around piercing member 54 and out through discharge aperture 62.

In the particular illustrated configuration, docking station 16 defines a nested series of coaxial chambers. There is a first chamber forming cavity 50 that is defined by sidewall 56. There is a second chamber coaxial with the first chamber defined by sidewall 66 (which can optionally form retention mechanism 52). There is a third chamber coaxial with the first chamber and the second chamber defined by piercing member 54. When container 18 includes a necked down region that defines the intended opening or discharge point for the container, the entire container can fit in the first chamber defined by sidewall 56 and the necked down region of the container can fit into the second chamber defined by sidewall 66. Piercing member 54 can then project up into the neck down region of the container, breaching the material structure the container that holds the contents in the container. Once breached, chemical discharge from container 18 can flow through discharge aperture in the region defined between sidewall 66 and piercing member 54 and/or through a center of the piercing member.

Piercing member 54 may include one or more sharpened points or apexes 57 to help pierce the container during insertion. FIG. 7A illustrates piercing member 54 as including a single sharpened point 57 to help pierce container 18 during insertion. In other configurations, piercing member 54 can have multiple sharpened points (e.g., arrayed at different points around the perimeter of discharge aperture 62). In still other examples, piercing member 54 may not include a sharpened point but may simply provide a blunt surface that is effective to penetrate container 18, as the container is pushed into the piercing member. The specific configuration of piercing member 54 used may depend on the configuration of container 18 and the resistance of the container to being pierced by piercing member 54.

In general, container 18 can be fabricated from any material that is chemically compatible with and chemically resistant to the type of chemical placed in the reservoir. In various examples, container is fabricated from a polymeric material, such as a molded plastic, or a metal, such as aluminum or steel. Container 18 may include a dispensing outlet that is covered with a film. The film may be a polymeric film, a metal or metallized film, or other film structure. The film may typically have a thickness less than a thickness of the remainder of container 18, which allows the film to be punctured comparatively easier than puncturing the remainder of container 18. In some examples, the dispensing outlet covered with film is further enclosed by a cap or other more rigid protective structure. This may help prevent the film from being inadvertently penetrated during transportation or storage. In use, the operator may remove the cap or more rigid protective structure from container 18, exposing the underlying film. The operator may then invert container 18 to position the dispensing outlet of the container covered by film downwardly toward piercing member 54. The operator can then move container 18 into cavity 50, causing piercing member 54 to contact the film covering the dispensing outlet of the container and, as the container continues to move deeper into the cavity, puncture the film.

To help ensure that the film covering the dispensing outlet of container 18 is punctured deep enough to cause the contents of the container to adequately dispense, the height of piercing member 54 may be designed relative to the size of the dispensing outlet of container 18. In FIG. 7A, piercing member 54 is illustrated as having a height 68. In some examples, height 68 of piercing member 54 is designed to be greater than the cross-sectional area (e.g., diameter) of the dispensing outlet of container 18. When so configured, piercing member 54 may be able to puncture the film covering the dispensing outlet of container 18 and push the pierced film previously covering the dispenser outlet away from the outlet. This can help move the film previously covering the dispenser outlet to an offset side of the outlet, helping to prevent a residual flap of film from blocking free flow of chemical out of the pierce container. In various examples, the height 68 of piercing member 54 may range from 0.2 to 5 times the cross-sectional area of the dispensing outlet of container 18, such as from 0.5 to 2 times the cross-sectional area of the dispensing outlet.

In general, piercing member 54 may be positioned at a location inside of docking station 16 that is deep enough such that the piercing member does not engage container 18 until the container is partially or fully inserted into the docking station. For example, piercing member 54 may be positioned relative to retention mechanism 52 such that the piercing member contacts container 18 concurrent with or after the retention mechanism engaging the container. In various examples, piercing member 54 may be positioned to pierce container 18 as the container is end of the container is being threaded into complementary threading, as the end of the container is being frictionally engaged with a frictionally engaging region of the docking station, and/or as the bottom end of the container is being engaged by projection 64. Accordingly, in some examples, container 18 may not be breached by piercing member 54 until the container is being mechanically engaged by retention mechanism 52, e.g., such that piercing member 54 pierces the container simultaneous with retention mechanism 52 engaging the container. Coordinating the engagement of piercing member 54 and retention mechanism 52 with container 18 may be useful to help lock the container in cavity 50 while piercing the container. When so implemented, this configuration may help prevent a user from inadvertently pulling container 18 back out of cavity 50 after the container has been pierced by piercing member 54.

In one example illustrated in FIG. 7A, docking station 16 includes a single sharpened point 57 projecting upwardly away from a remainder of the piercing member 54. Configuring piercing member 54 with a single sharpened point 57 may be useful to asymmetrically pierce container 18 (e.g., a film covering dispensing outlet of the container). For example, when so configured, a film covering the dispensing outlet of container 18 may be entirely cut or detached on the side of piercing member 54 where sharpened point 57 is positioned but not on the opposite side of the piercing member lacking a sharpened point. This can create a hinged region of film that keeps the pierced film attached to container 18 but allows the pierced film to rotate out of the way of the dispensing outlet of container 18.

In general, it is desirable if the entire volume of container 18 discharges quickly from the container upon the container being pierced. This reduces the processing time required for the operator to dispense the chemistry. Moreover, if container 18 empties quickly, it reduces the likelihood that the operator premature withdraws container 18 from docking station 16 expecting the container to be finished discharging. One or more design features may be incorporated into docking station 16 to help facilitate rapid discharge of container 18 upon being punctured. For example, as discussed above with respect to FIGS. 6C-6F, docking station 16 may allow container 18 to be withdrawn off piercing member 54 after being punctured, removing the piercing member from the hole created in the container. Additional or alternatively, one or more flow-through apertures may be created in the wall structure (e.g., sidewall and/or bottom wall) defining piercing member 54. The flow-through may be an opening in the wall that increases the open area through which chemistry exiting out of container 18 can pass.

Figure 7C:
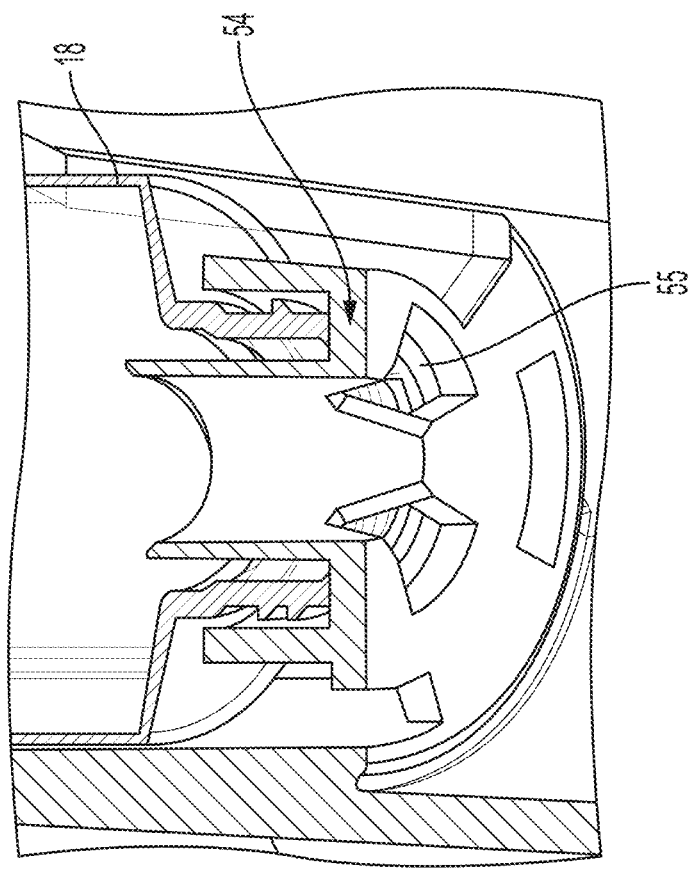
FIGS. 7B and 7C are side and bottom perspective views, respectively, showing an example configuration of a piercing member having one or more flow-through apertures.
Figure 7B:
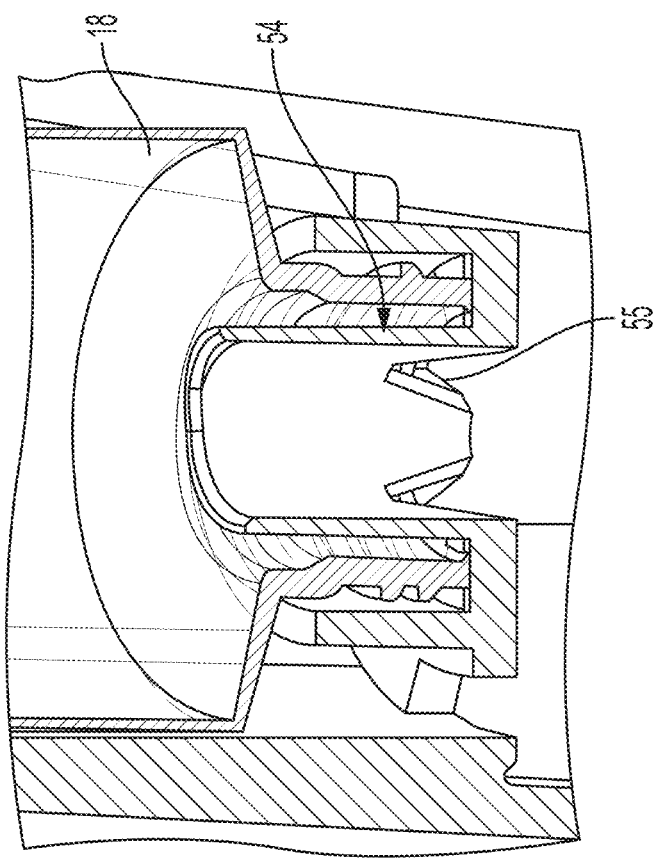

FIGS. 7B and 7C are side and bottom perspective views, respectively, showing an example configuration of piercing member 54 in which the wall structure defining the piercing member includes one or more flow-through apertures 55. In particular, in the illustrated example, each flow-through aperture 55 is illustrated as hole formed through a portion of the sidewall and bottom wall of the structure defining piercing member 54 although may have a different shape and/or configuration in different implementations. As illustrated, piercing member 54 includes a plurality (e.g., two, three, four, or more) of flow-through apertures 55 arrayed at different locations about the perimeter of the piercing member and/discharge aperture. Piercing member 54 can have a different number or positioning of flow-through apertures 55, when used.

As another example flow enhancing feature that can be used in addition to or in lieu of those discussed above, docking station 16 may a cap which, when closed penetrates a wall surface (e.g. a bottom wall surface and/or sidewall surface) of the container to vent the container during discharge. This can allow air to enter the container through a different opening that the opening created by piercing member 54, e.g., to help prevent a flow-restricting vacuum from forming in the container as concentrated chemical flows out the container.

Figure 7E:
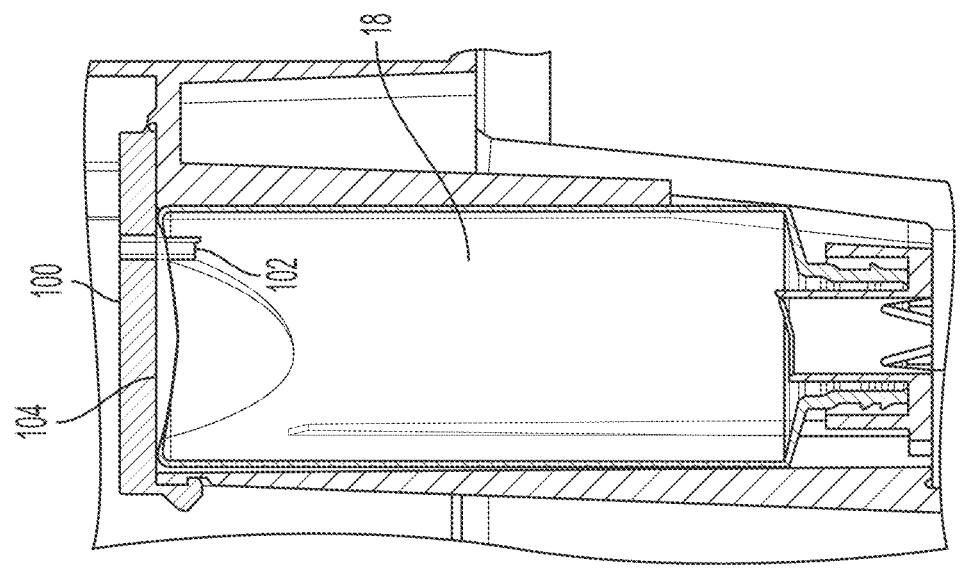
FIGS. 7D and 7E illustrate an example cap arrangement of for a docking station.
Figure 7D:
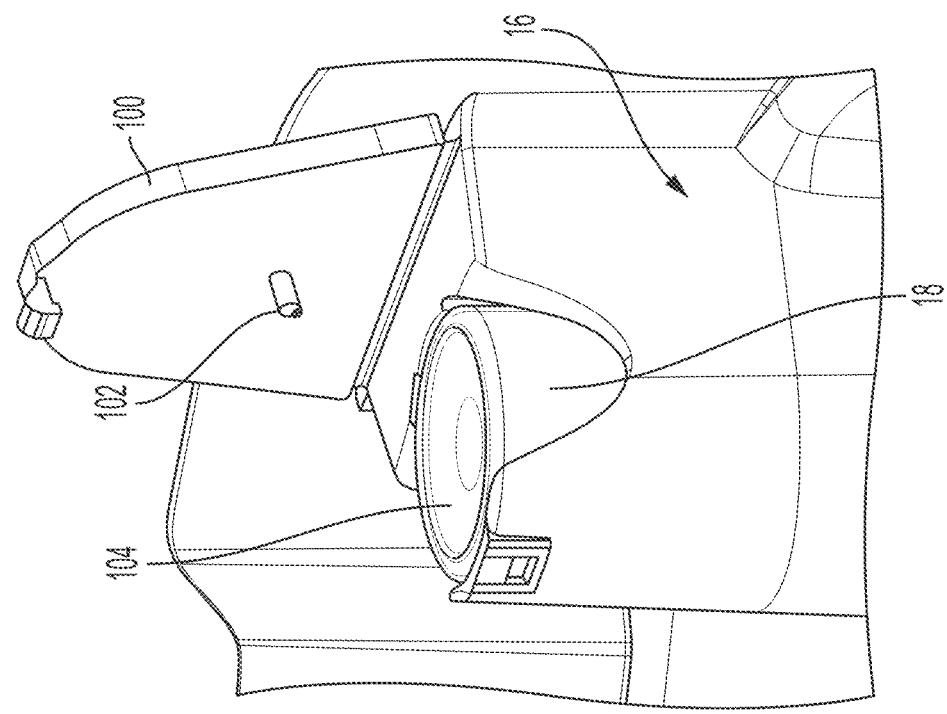

FIGS. 7D and 7E illustrate an example arrangement of docking station 16 in which the docking station includes an example cap 100. Cap 100 can have a vented projection 102. Cap 100 can be positionable over a bottom surface of container 18, when the container is inserted into the receiving cavity of the docking station. For example, cap may be hingedly connected and configured to rotate closed over container 18, when inserted into the receiving cavity of the docking station. Vented projection 102 may be a hollow lumen or tube the extends from cap 100 (e.g., downwardly, when the cap is closed). Vented projection 102 may or may not have a sharpened tip or other feature to help the projection puncture container 18. In either case, the user can position container 18 in the receiving cavity of docking station 16 and close cap over the container. As the cap is positioned over the container, vented projection 102 can penetrate through the wall surface (e.g., bottom wall 104) of the container, establishing fluid communication between an interior of the container and ambient air environment via the vent.

Container 18 may contain any type of material desired to be stored and dispensed using the container. Example chemicals that may be stored and dispensed using container include, but are not limited to, a biocide, an anti-microbial agent, a sanitizers, a sterilant, a cleaner, a degreaser, a lubricant, a detergent, a stain remover, a rinse agent, an enzyme, or combinations thereof. The chemical may typically be in a liquid from although in other applications may be in a solid form or a pseudo-solid/liquid form, such as a gel or paste. The chemical may be at a higher concentration than that desired for end use. Accordingly, the user may add a diluent such as water to reservoir 12 that is mixed with the concentrated chemical from container 18 to form a use solution. That being said, in other implementations, the chemical in container 18 may be at a ready-to-use concentration and may be introduced into reservoir 12 and used without further dilution.

As noted above, docking station 16 can be a separate component from reservoir 12 and/or strainer basket 14 that can then be engaged or interlocked with one or both components. Alternatively, docking station 16 may be permanently integrated into reservoir 12 and/or strainer basket 14, e.g., by molding the features together. When docking station 16 is configured to be removable from and insertable into reservoir 12 and/or strainer basket 14, the docking station may include one or more mechanical engagement features that engage with complementary surfaces and/or features on reservoir 12 and/or strainer basket 14.

With further reference to FIGS. 6A and 6B, docking station 16 in the illustrated example is shown as include a clip 70 extending outwardly from sidewall 56 of the docking station. Clip 70 may engage with a lip or top edge of reservoir 12 and/or strainer basket 14. For example, clip 70 may define a channel 72 into which the top edge of reservoir 12 and/or strainer basket can be positioned, interlocking the clip over the top edge. FIG. 1 illustrates such an example arrangement in which clip 70 is interlocked on the top edge of strainer basket 14 which, in turn, is rests on the top edge of reservoir 12 via ridge 42.

Referring back to FIGS. 6A and 6B, docking station 16 may additionally or alternatively include one or more bayonet lugs 74 configured to be inserted into one or more corresponding bayonet receiver openings defined by sidewall 20 of reservoir 12 and/or sidewall 28 of strainer basket 14. Bayonet lug 74 may be a projection that is insertable into a corresponding opening the sidewall of reservoir 12 and/or strainer basket 14 to interlock the docking station to the reservoir and/or strainer basket. For example, bayonet lug 74 can be inserted into a corresponding bayonet receiver openings defined by sidewall 28 of strainer basket 14 by inserting the lug into the opening and then pushing docking station 16 downwardly with respect to the strainer basket.

A variety of alternative configurations may be used to position docking station 16 relative to reservoir 12 and strainer basket 14 to dispense the contents of container 18 therein. For example, strainer basket system 10 may include a removable cover that can be positioned over the top of reservoir 12 (and strainer basket 14, when the strainer basket is inserted into the reservoir). Docking station 16 may be formed in the lid or otherwise mounted to and/or in the lid. Accordingly, when the lid is placed on top of reservoir 12 with strainer basket 14 inside of the reservoir, docking station 16 may be positioned to discharge chemical from container 18 into the reservoir and/or strainer basket.

Instead of being configured to be removable from reservoir 12 and/or strainer basket 14, docking station 16 may alternatively be permanent formed with or otherwise permanent integrated into the structure defining reservoir 12 and/or strainer basket 14. For example, docking station 16 may be formed into sidewall 20 of reservoir 12 or into sidewall 28 of strainer basket 14.

Figure 8B:
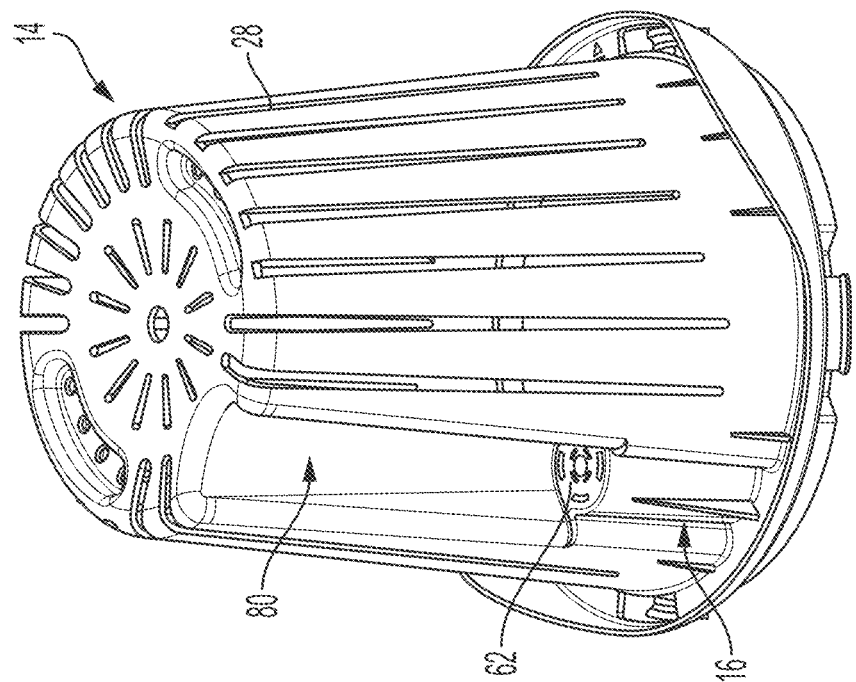
FIGS. 8A and 8B are top and bottom perspective views, respectively, showing an example configuration of a strainer basket that can be used in the system of FIG. 1.
Figure 8A:
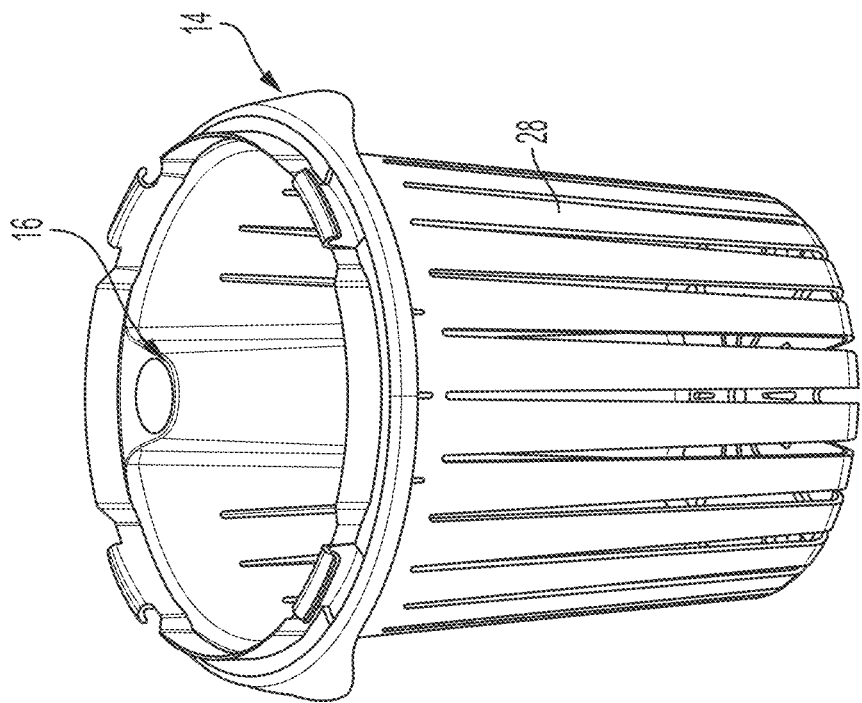

FIGS. 8A and 8B are top and bottom perspective views, respectively, showing an example configuration of strainer basket 14 in which docking station 16 is formed in the upwardly extending sidewall 28 of the strainer basket. In particular, in the illustrated configuration, docking station 16 is formed in sidewall 28 of strainer basket 14 such that the discharge aperture 62 defined by the docking station is positioned on an external side of the strainer basket. As a result, when strainer basket 14 is inserted into reservoir 12, discharge aperture 62 is positioned between sidewall 20 of the reservoir and sidewall 28 of the strainer basket. A similar positioning can be achieved by forming docking station 16 into sidewall 20 of reservoir 12 with discharge aperture 62 of the docking station being positioned on an internal side of the reservoir sidewall. In either case, positioning discharge aperture 62 of docking station 16 between reservoir 12 and strainer basket 14 may be useful to promote mixing between concentrated chemical discharged from the docking station and a diluent in the reservoir, e.g., rather than discharging the chemical on the material to be processed in the strainer basket. This configuration may also further shield the concentrated chemical discharged from container 18 via docking station 16 from inadvertent contact by a user. That being said, alternative implementations can position the discharge aperture 62 of docking station 16 on an internal side of strainer basket 14.

Figure 9:
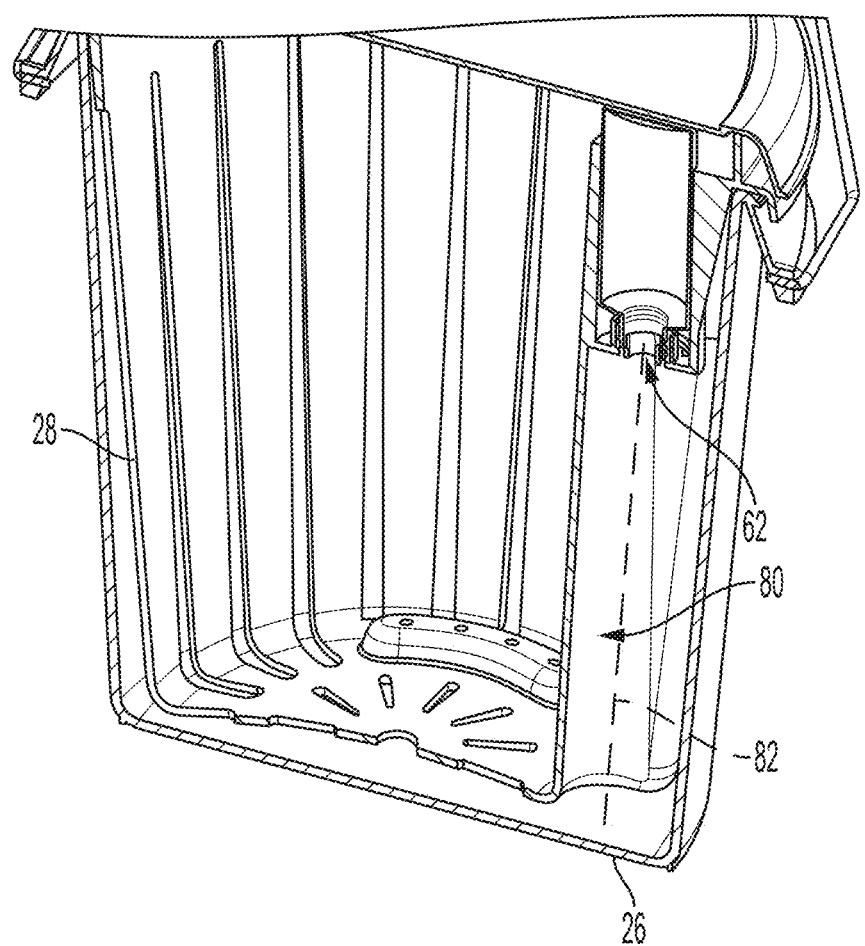
FIG. 9 is a sectional illustration of the example strainer basket of FIGS. 8A and 8B.

To help facilitate discharge of chemical out of container 18 into reservoir 12 and/or strainer basket 14 (an optionally efficient mixing between the chemical and a diluent), strainer basket 14 may define a recessed channel 80 under discharge aperture 62 (FIG. 8B). Recessed channel 80 may be a section of sidewall 28 that is recessed (e.g., inwardly toward a center of the basket) relative to a reminder of the sidewall. Recessed channel 80 can define a linear flow pathway extending from discharge aperture 62 to bottom wall 26 of reservoir 12 that is unimpeded by strainer basket 14. For example, FIG. 9 is a sectional illustration of strainer basket system 10 illustrating an example flow pathway 82 that may be defined by the recessed channel 80 formed in strainer basket 14 of FIGS. 8A and 8B.

In some configurations in which strainer basket 14 defines recessed channel 80, the region of sidewall 28 defining the recessed channel may be devoid of apertures. For example, the region of sidewall 28 defining recessed channel 80 may be formed of a solid, unapertured section of material. This may help limit that extent to which concentrated chemical discharged from docking station 16 contacts material to be processed in strainer basket 14 until the concentrated chemical has intermixed with a diluent in reservoir 12 to form a use solution.

Independent of whether docking station 16 is removably attachable to or permanently integrated with reservoir 12 and/or strainer basket 14, the docking station may discharge chemical from container 18 at a desired location in strainer basket system 10. In general, the discharge aperture 62 defined by docking station 16 may be positioned at a location in strainer basket system 10 effective to dispense chemical into reservoir 12 and/or strainer basket 14. In some examples, the discharge aperture 62 may be positioned sufficiently deep in the system such that the bottom surface of discharge aperture 62 is below the top edge of reservoir 12 and/or the top edge of strainer basket 14, such as at least 25 cm below the top edge, at least 50 cm below the top edge, or at least 100 cm below the top edge of one or both structures.

While the bottom surface of discharge aperture 62 may be below the top edge of reservoir 12 and/or the top edge of strainer basket 14, the bottom surface of discharge aperture 62 may also be positioned above bottom wall 26 of reservoir 12 a separation distance. This separation distance can facilitate mixing and dilution of chemical from container 18 during dispensing. The distance between the bottom surface of discharge aperture 62 and bottom wall 26 of reservoir 12 may be at least ¼ of the overall length of reservoir 12, such as at least ½ of the overall length of the reservoir. Other positions and distances for locating discharge aperture 62 of docking station 16 can be used without departing from the scope of the disclosure.

Various examples have been described. These and other examples are within the scope of the following claims.

The invention claimed is:

1. A method of dispensing chemical into a strainer basket system comprising:
    adding a material to be processed into a strainer basket that is configured to be positioned inside of a reservoir;
    dispensing a chemical into the strainer basket by at least:
        inserting a container of the chemical into a receiving cavity of a chemical dispensing docking station having a discharge aperture positioned to discharge chemical to be dispensed in at least one of the reservoir and the strainer basket;
        engaging the container with a retention mechanism of the chemical dispensing docking station; and
        piercing the container with a piercing member of the chemical dispensing docking station, thereby dispensing the chemical from the container into the strainer basket.

2. The method of claim 1, wherein engaging the container with the retention mechanism of the chemical dispensing docking station comprises moving a bottom surface of the container under a projection of the chemical dispensing docking station extending at least partially over the cavity.

3. The method of claim 1, wherein engaging the container with the retention mechanism and piercing the container with the piercing member comprises piercing the container with the piercing member and subsequently withdrawing the container from the piercing member and engaging the container with the retention mechanism.

4. The method of claim 1, wherein inserting the container of the chemical into the receiving cavity of a chemical dispensing docking station comprises positioning an opening of the container below an uppermost surface of the reservoir before piercing the container with the piercing member.

5. The method of claim 1, wherein piercing the container with the piercing member comprises piercing a film covering an opening of the container as the container is inserted axially downwardly into the cavity of the chemical dispensing docking station.

6. The method of claim 1, wherein piercing the container with the piercing member comprises piercing the container with the piercing member as the container is engaged with the retention mechanism.

7. The method of claim 1, wherein:
the material to be processed is a human-consumable food,
the chemical comprises an antimicrobial agent, and
further comprising, prior to or after dispensing the chemical from the container into the strainer basket, adding water to the reservoir.

8. The method of claim 1, wherein adding the material to be processed into the strainer basket comprises adding the material to be processed into the strainer basket after dispensing the chemical into the strainer basket.

9. The method of claim 1, wherein adding the material to be processed into the strainer basket comprises adding the material to be processed into the strainer basket while the strainer basket is positioned inside of the reservoir.

10. The method of claim 1, further comprising, prior to dispensing the chemical into the strainer basket, adding water to one or both of the strainer basket and the reservoir.

11. The method of claim 1, further comprising interlocking the chemical dispensing docking station with the at least one of the reservoir and the strainer basket.

12. The method of claim 1, wherein engaging the container with the retention mechanism of the chemical dispensing docking station comprises threadingly engaging the container with retention mechanism.

13. The method of claim 1, wherein the chemical dispensing docking station comprises an upwardly-extending sidewall and a bottom wall through which the discharge aperture is formed, the discharge aperture has a smaller cross-sectional area than a cross-sectional area of the receiving cavity, and the piercing member comprises one or more projections positioned coaxially with the discharge aperture.

14. The method of claim 1, wherein the discharge aperture of the chemical dispensing docking station is positioned laterally offset from a sidewall of the strainer basket and below an uppermost surface of the reservoir, when the strainer basket is positioned inside of the reservoir.

* * * * *